(12) United States Patent
Kim et al.

(10) Patent No.: US 12,145,790 B2
(45) Date of Patent: Nov. 19, 2024

(54) COOLING TANK, WATER PURIFIER HAVING SAME, AND COOLING TANK MANUFACTURING METHOD

(71) Applicant: COWAY CO., LTD., Chungcheongnam-do (KR)

(72) Inventors: Kyu-Jun Kim, Seoul (KR); Chul-Ho Kim, Seoul (KR); Young-Hoon Hong, Seoul (KR); Min-Chul Yong, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 219 days.

(21) Appl. No.: 17/779,377

(22) PCT Filed: Dec. 4, 2020

(86) PCT No.: PCT/KR2020/017592
§ 371 (c)(1),
(2) Date: May 24, 2022

(87) PCT Pub. No.: WO2021/112604
PCT Pub. Date: Jun. 10, 2021

(65) Prior Publication Data
US 2022/0402681 A1   Dec. 22, 2022

(30) Foreign Application Priority Data

Dec. 5, 2019  (KR) .................. 10-2019-0161061
Dec. 5, 2019  (KR) .................. 10-2019-0161063

(51) Int. Cl.
*B65D 81/38*  (2006.01)
*B29C 44/12*  (2006.01)
(Continued)

(52) U.S. Cl.
CPC .......... *B65D 81/38* (2013.01); *B29C 44/1257* (2013.01); *B29C 44/42* (2013.01);
(Continued)

(58) Field of Classification Search
CPC .......... B65D 81/00–38; B29C 44/1257; B29C 44/42; B29C 44/18; B29C 44/1242;
(Continued)

(56) References Cited

U.S. PATENT DOCUMENTS 2,302,336 A * 11/1942 MacDonald ........... A01K 63/02
119/214
3,675,819 A *  7/1972 Hanson ................ B67D 1/0078
222/51
(Continued)

FOREIGN PATENT DOCUMENTS

DE   102008042995 A1   4/2010
GB       1403771 A     8/1975
(Continued)

OTHER PUBLICATIONS

Extended European Search Report of Counterpart EP Application No. 20896586.3, issued Nov. 15, 2022 (7 pages).
(Continued)

*Primary Examiner* — Kareen K Thomas
(74) *Attorney, Agent, or Firm* — Guntin & Gust, PLC; Miyoung Shin

(57) ABSTRACT

Provided is a cooling tank comprising a tank body in which a water accommodation space is formed, a foaming case for encompassing the outer peripheral surface of the tank body, and a foam insulating material formed by a foaming agent flowing into the foaming space between the outer peripheral surface of the tank body and the foaming case, and then foaming, wherein the foam insulating material is integrated with the tank body and the case through foaming, and the
(Continued)

case has an air outlet through which air of the foaming space is discharged during a foaming process.

12 Claims, 17 Drawing Sheets

(51) Int. Cl.
*B29C 44/42* (2006.01)
*B29K 75/00* (2006.01)
*B29L 31/00* (2006.01)
*F25D 31/00* (2006.01)

(52) U.S. Cl.
CPC .. *B29K 2075/00* (2013.01); *B29K 2995/0015* (2013.01); *B29L 2031/712* (2013.01); *F25D 31/003* (2013.01)

(58) Field of Classification Search
CPC ........ B29K 2075/00; B29K 2995/0015; B29L 2031/00–712; F25D 31/00–003; B67D 2210/00044; B67D 1/0864
See application file for complete search history.

(56) References Cited

U.S. PATENT DOCUMENTS

| | | | | |
|---|---|---|---|---|
| 3,696,631 A | * | 10/1972 | Valdes | B63B 35/24 62/375 |
| 3,727,579 A | * | 4/1973 | Lee | A01K 63/00 119/201 |
| 3,882,693 A | * | 5/1975 | Hiller | F28F 1/02 62/394 |
| 4,335,836 A | * | 6/1982 | Harvill | F25D 31/002 222/108 |
| 4,527,543 A | | 7/1985 | Denton | |
| 5,180,190 A | * | 1/1993 | Kersey | B65D 90/022 428/36.1 |
| 2004/0058119 A1 | * | 3/2004 | Wynne | B29C 53/063 428/69 |
| 2017/0050837 A1 | | 2/2017 | Kim | |
| 2017/0291807 A1 | | 10/2017 | Jeon | |
| 2020/0080755 A1 | | 3/2020 | Jung et al. | |

FOREIGN PATENT DOCUMENTS

| | | |
|---|---|---|
| JP | S57-060082 U | 4/1982 |
| KR | 1020110112078 A | 10/2011 |
| KR | 1020140001462 A | 1/2014 |
| KR | 1020150125396 A | 11/2015 |
| KR | 1020170022775 A | 3/2017 |
| KR | 1020170116457 A | 10/2017 |
| KR | 1020180119251 A | 11/2018 |
| KR | 20180128149 A | 12/2018 |

OTHER PUBLICATIONS

International Search Report and Written Opinion issued in corresponding International Application No. PCT/KR2020/017592, mailed Mar. 22, 2021, 9 pages.

Japanese Office Action for Corresponding JP Application No. 2022-530845, mailed Jun. 18, 2024, 5 pages.

* cited by examiner (a)

(b)

COOLING TANK, WATER PURIFIER HAVING SAME, AND COOLING TANK MANUFACTURING METHOD

CROSS-REFERENCE OF RELATED APPLICATIONS AND PRIORITY

The Present Application is a national stage application of International Application No. PCT/KR2020/017592 filed on Dec. 4, 2020 which claims priority to Korean Patent Application Nos. 10-2019-0161061 filed Dec. 5, 2019 and 10-2019-0161063 filed Dec. 5, 2019, the disclosure of which are incorporated by reference as if fully set forth herein.

TECHNICAL FIELD

The present disclosure relates to a cooling tank for a water purifier, a water purifier including the same, and a method for manufacturing the cooling tank, and more particularly, to a cooling tank in which a foamed thermal insulating material is formed by injecting a foaming agent between a foaming case and a tank body, a water purifier including the same, and a method for manufacturing the cooling tank.

BACKGROUND ART

Water purifiers may have devices for filtering harmful elements such as foreign substances, heavy metals, or the like contained in water, and water ionizers, water softeners, and the like may also belong to water purifiers in a broad sense. Such water purifiers may be configured to provide hot water and/or cold water, and for this purpose, a heating device and/or a cooling device (a cold water generator) may be provided therein.

Such a cold water generator may also use a tank cooling method generating cold water with directly cooling water contained in a cold water tank by an evaporation tube (evaporator), or an ice-condensed cooling method discharging cold water through a cold water pipe by installing an evaporation tube (evaporator) through which a refrigerant flows and the cold water pipe through which purified water flows, in an ice-condensed tank, cooling an ice-condensed solution accommodated in the ice-condensed tank by the evaporation tube (evaporator), and thermally exchanging the cooled ice-condensed solution or ice with the purified water flowing through the cold water pipe. To this end, the evaporation tube (evaporator) may be connected to a compressor, a condenser, and an expansion valve to constitute a cooling cycle.

Meanwhile, a cooling tank provided in the cold water generator for accommodating cold water (purified water or an ice-condensed solution) may exchange heat with an external source, to increase a temperature of water contained therein, such that dew condensation may occur (generated condensed water) on a surface of the tank body with a low temperature. In particular, when dew condensation occurs, mold may easily grow on the surface of the tank body due to mold spores in the air, which often causes discomfort to users.

In order to secure such cold retaining performance and/or anti-dew condensation performance, a thermal insulating material (a cold retaining material) may be installed on a surface of the tank body in many cases. Such a thermal insulating material has been manufactured separately as expandable polystyrene (EPS), Styrofoam, or the like to have a shape corresponding to a shape of the surface of the tank body, and used in a manner attached to the surface of the cooling tank.

However, since such an EPS insulating material may be separately manufactured and attached to the tank body, a gap into which external air penetrates may be formed between the cooling tank and the EPS insulating material. Therefore, when the EPS insulating material is used, not only thermal insulation performance (cold retaining performance) may not be sufficient, but also dew condensation may occur (generated condensed water) on the surface of the tank body, and external air can penetrate into these condensed regions, to create an environment in which mold may easily grow.

In order to solve problems regarding the EPS insulating material, a nude foaming method in which a foamed thermal insulating material is directly formed on a surface of a tank body has recently been used. Korean Patent Publication No. 2017-0022775 proposes a nude foaming method in which a polyurethane foamed thermal insulating material is formed on an external peripheral surface of a cold water tank assembly by inserting the cold water tank assembly into a foaming jig and then performing a foaming process.

However, in such a nude foaming process, there may be problems that, since a foamed thermal insulating material is formed between a surface of the foaming jig (or a vinyl provided on the surface of the foaming jig) and the cold water tank assembly, a foamed surface may not be clean, and since a large amount of foaming powder particles may be generated in post-processing operations such as a process of grinding or deburring the foamed surface, a process of removing the vinyl, or the like, the foam powder particles, which may be impurities, may remain in the tank. In particular, in this nude foaming process, since the foamed thermal insulating material is directly exposed to ambient air, air may move through fine pores formed in the foamed thermal insulating material. Furthermore, the foamed thermal insulating material formed by the nude foaming process may have problems in that not only may mold grow in the pores therein, but it may also be difficult to remove the mold generated in the pores. In particular, the mold may continue to spread into the foamed thermal insulating material through the pores of the foamed thermal insulating material, causing user discomfort as well as sanitary issues.

PRIOR ART LITERATURE(S)

(Patent Document 1) KR 2017-0022775 A

SUMMARY OF INVENTION

Technical Problem

An aspect of the present disclosure is to solve at least some of the problems of the prior art as described above, and to provide a cooling tank securing sufficient dew condensation performance and thermal insulation performance, a water purifier including the same, and a method of manufacturing the cooling tank.

Another aspect of the present disclosure is to provide a cooling tank minimizing a non-foamed region, a water purifier including the same, and a method of manufacturing the cooling tank.

Another aspect of the present disclosure is to facilitate manufacturing of a cooling tank, a water purifier including the same, and a method of manufacturing the cooling tank.

Another aspect of the present disclosure is to provide a cooling tank shielding a tank body and a foamed thermal insulating material from contact with external air, a water purifier including the same, and a method of manufacturing the cooling tank.

Another aspect of the present disclosure is to provide a cooling tank of which it is easy to clean an external surface and remove dew condensation (generated condensed water), a water purifier including the same, and a method of manufacturing the cooling tank.

Solution to Problem

According to an aspect of the present disclosure, a cooling tank includes a tank body in which a water accommodation space is formed; a foaming case surrounding an external peripheral surface of the tank body; and a foamed thermal insulating material formed by a foaming process after a foaming agent is introduced into a foaming space between the external peripheral surface of the tank body and the foaming case, wherein the foamed thermal insulating material is integrated with the tank body and the foaming case by the foaming process, and an air outlet through which air in the foaming space is discharged during the foaming process is formed in the foaming case.

In addition, an injection port injecting the foaming agent may be formed in the foaming case.

Further, the injection port may be formed adjacent to one side of the foaming case, and the air outlet may include a main outlet formed to oppose the injection port and adjacent to the other side of the foaming case. A diameter of the main outlet may have a value of 4 to 15 mm.

In addition, the air outlet may further include a corner outlet located at a corner of the foaming case. In this case, a diameter of the corner outlet may have a value of 0.5 to 1.5 mm.

Further, the foaming case discharges the air through the main outlet, and a shielding film member shielding leakage of the foamed thermal insulating material may be installed at the main outlet.

In addition, the foaming case may have a divided structure.

Further, the foaming case may have a downward inclination, inclined toward a center from an external side of a lower surface.

In addition, the foamed thermal insulating material may have a density of 0.065 to 0.085 g/cm$^3$ after curing is completed.

Further, the tank body may have a tank edge portion corresponding to an open region, and the foaming case may have a case edge portion corresponding to the tank edge portion, wherein the tank edge portion and the case edge portion may be insertedly fastened to each other.

In this case, the tank edge portion may have protruding portions protruding toward the case edge portion, and the case edge portion may have a receiving portion formed between protruding portions of the case edge portion to be insertedly fastened to the protruding portions of the tank edge portion.

Further, the tank body may have a water flow port protruding toward the foaming case to enable flow of water accommodated in the water accommodation space, and a sealing member attached to the foaming case to seal the foaming space from an external space may be installed on an external surface of the water flow port.

In this case, the water flow port may have a stepped structure in which a first stepped portion, a second stepped portion, and an end portion, having gradually smaller diameters in an external side direction of the tank body, are sequentially formed, and the foaming case may have a through-hole through which an end portion of the water flow port is exposed externally, a seating surface formed around the through-hole and corresponding to the second stepped portion, and a seating bump protruding toward the tank body to correspond to the first stepped portion around the seating surface. Further, the sealing member may be provided between the first stepped portion and the seating bump.

In addition, the tank body may have a bump protruding from the tank body toward the foaming case, and a sealing member attached to the foaming case to seal the foaming space from an external space may be installed on an external surface of the bump.

In this case, the bump may have a stepped structure, in which a first stepped portion, a second stepped portion, and an end portion, having gradually smaller diameters in an external side direction of the tank body, are sequentially formed, the foaming case may have a through-hole through which an end portion of the bump is exposed externally, a seating surface formed around the through-hole and corresponding to the second stepped portion, and a seating bump protruding toward the tank body to correspond to the first stepped portion around the seating surface, and the sealing member may be provided between the first stepped portion and the seating bump.

According to another aspect of the present disclosure, a cooling tank assembly includes the cooling tank of any one of claims 1 to 7; and a tank cover covering an open upper surface of the cooling tank, wherein at least a portion of a tube member and a sensor is coupled to the tank cover.

According to another aspect of the present disclosure, a water purifier includes a filter unit filtering incoming raw water to generate purified water; a cold water generator generating cold water with a cooling tank assembly including the cooling tank of any one of claims 1 to 7 and a tank cover covering an upper surface of the cooling tank; and an extracting unit supplying the cold water generated by the cold water generator to a user.

According to another aspect of the present disclosure, a method for manufacturing a cooling tank, includes a seating operation of seating a foaming assembly in which a tank body in which a water accommodation space is formed and a foaming case surrounding an external peripheral surface of the tank body are assembled, on a foaming jig; an injection operation of injecting a foaming agent into a foaming space formed between the external peripheral surface of the tank body of the foaming assembly and an internal surface of the foaming case through an injection port formed in the foaming case; an upper surface closing operation of closing an upper surface of the foaming jig; and a foaming-curing operation of foaming and curing the foaming agent to form a foamed thermal insulating material in the foaming space, wherein the foamed thermal insulating material is integrated with the tank body and the foaming case by the foaming-curing operation, and the foaming-curing operation is configured to discharge air present in the foaming space through an air outlet formed in the foaming case.

Advantageous Effects of Invention

According to an aspect of the present disclosure having such a configuration, it is possible to obtain effects of securing sufficient dew condensation performance and thermal insulation performance.

In addition, according to an aspect of the present disclosure, there may be an effect of minimizing a non-foamed region.

Moreover, according to an aspect of the present disclosure, it is possible to obtain an effect of being easy to manufacture a cooling tank.

In addition, according to an aspect of the present disclosure, there may be an effect of shielding a tank body and a foamed thermal insulating material from contact with external air.

Moreover, according to an aspect of the present disclosure, it is possible to obtain effects of being easy to clean an external surface and remove dew condensation (generated condensed water).

BEST MODE FOR INVENTION

Figure 1:
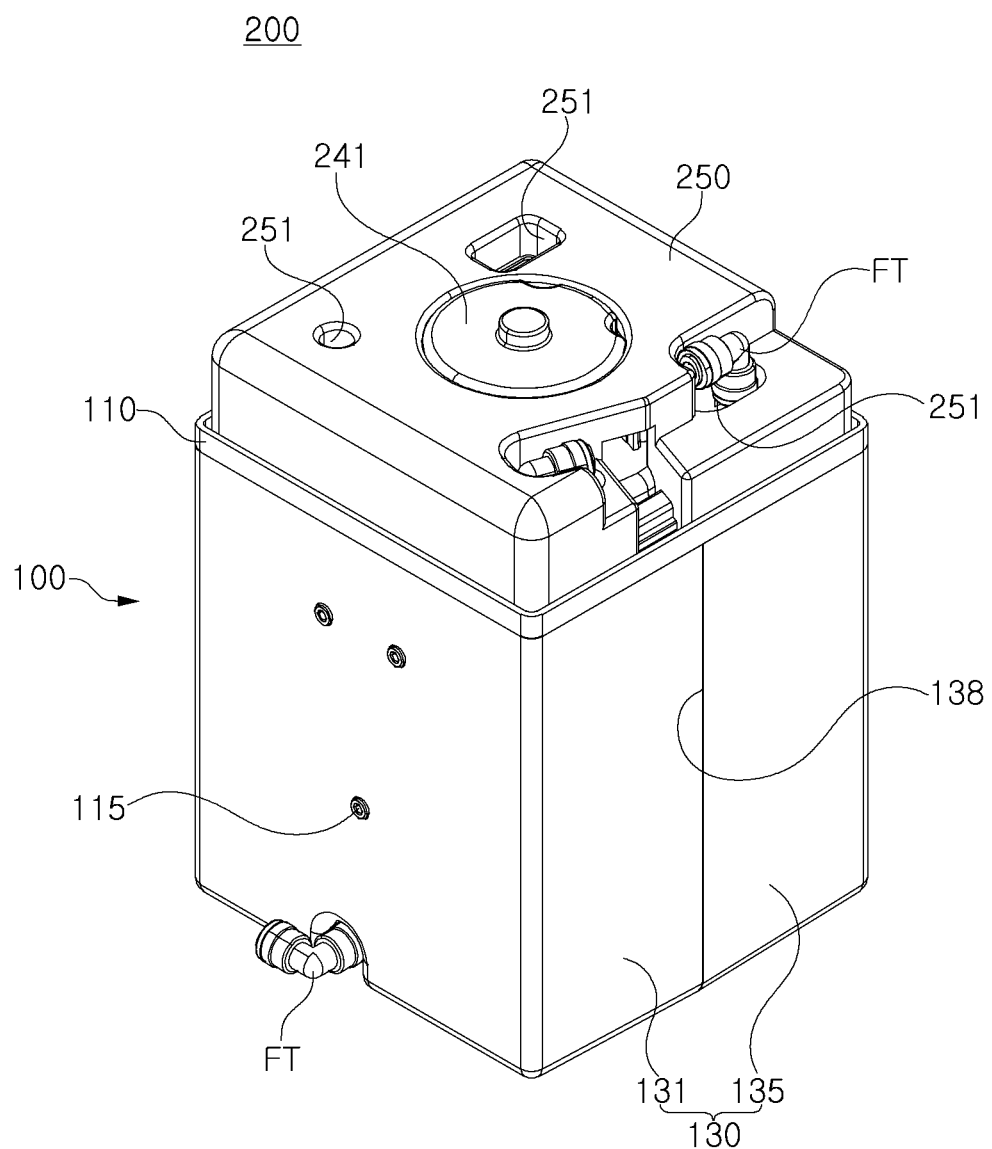
FIG. 1 is a perspective view of a cooling tank assembly according to an embodiment of the present disclosure.

Hereinafter, preferred embodiments of the present disclosure will be described with reference to the accompanying drawings. However, an embodiment of the present disclosure may be modified in various other forms, and the scope of the present disclosure is not limited to embodiments described below. In addition, embodiments of the present disclosure may be provided to explain the present disclosure more completely to those of ordinary skill in the art. Shapes and sizes of elements in the drawings may be exaggerated for clarity.

In addition, in the present specification, singular expressions may include plural expressions unless the context clearly dictates otherwise, and the same reference characters may refer to the same element or corresponding element throughout the specification.

Hereinafter, various embodiments of the present disclosure will be described with reference to the drawings.

[Cooling Tank Assembly 200]

First, a cooling tank assembly 200 including a cooling tank 100 according to an embodiment of the present disclosure will be described with reference to FIGS. 1 to 4.

Figure 2:
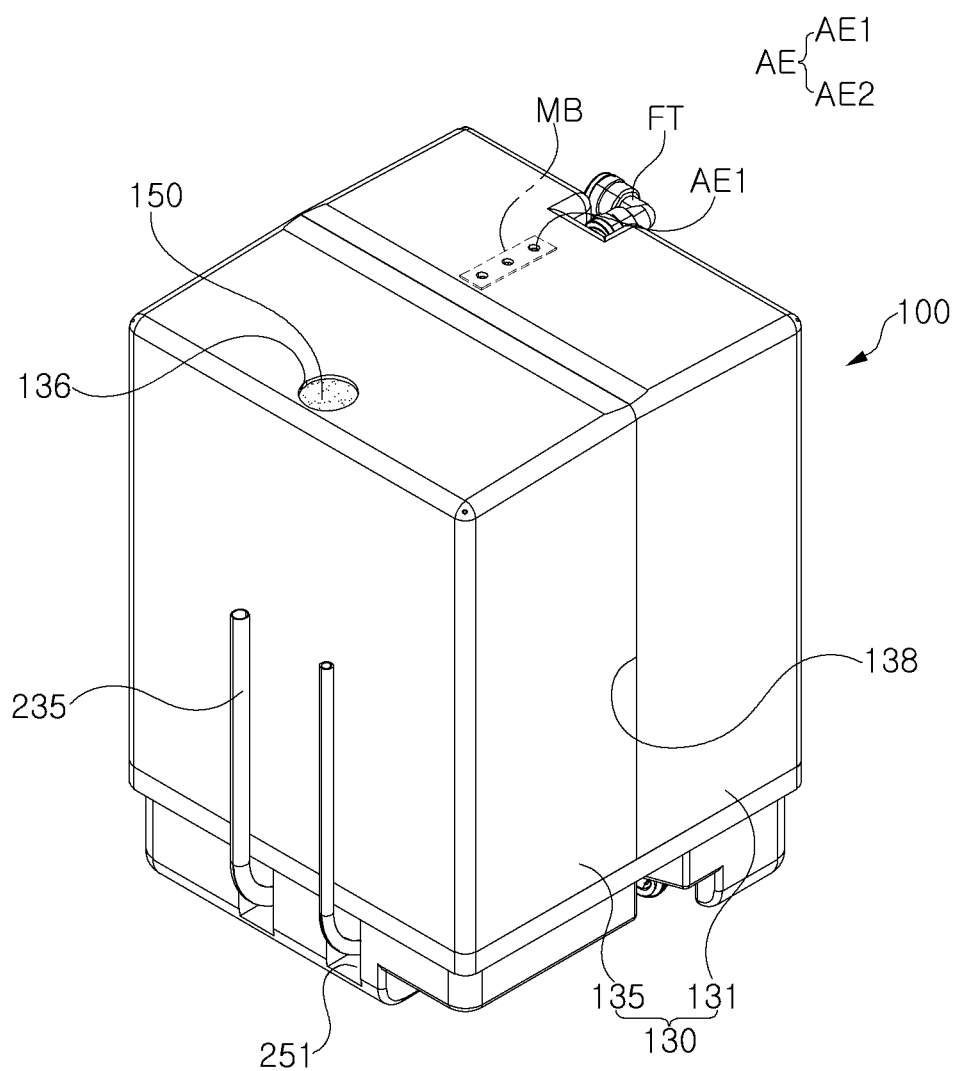
FIG. 2 is a perspective view illustrating the cooling tank assembly of FIG. 1 from below from the rear.
Figure 3:
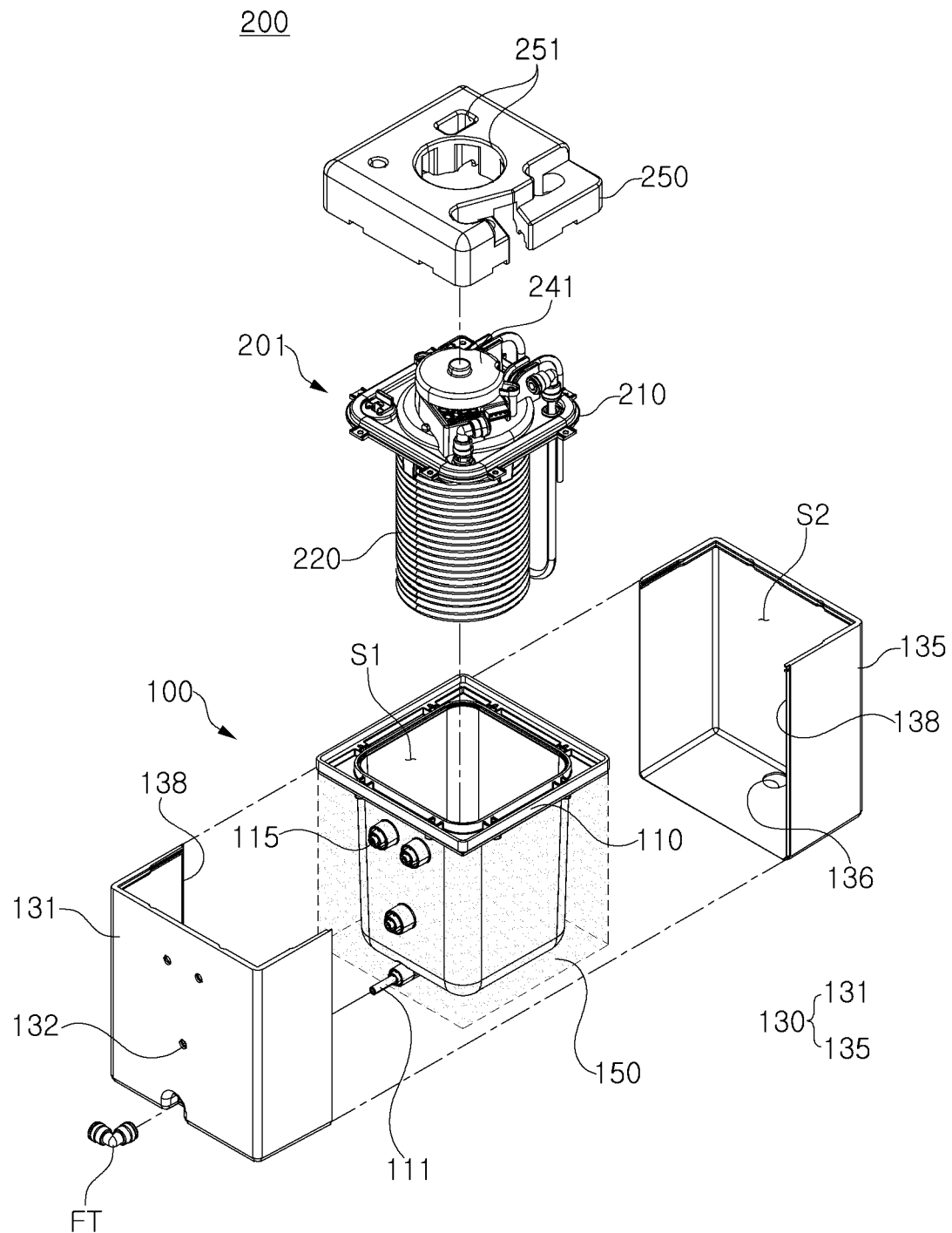
FIG. 3 is an exploded perspective view of the cooling tank assembly of FIG. 1.
Figure 4:
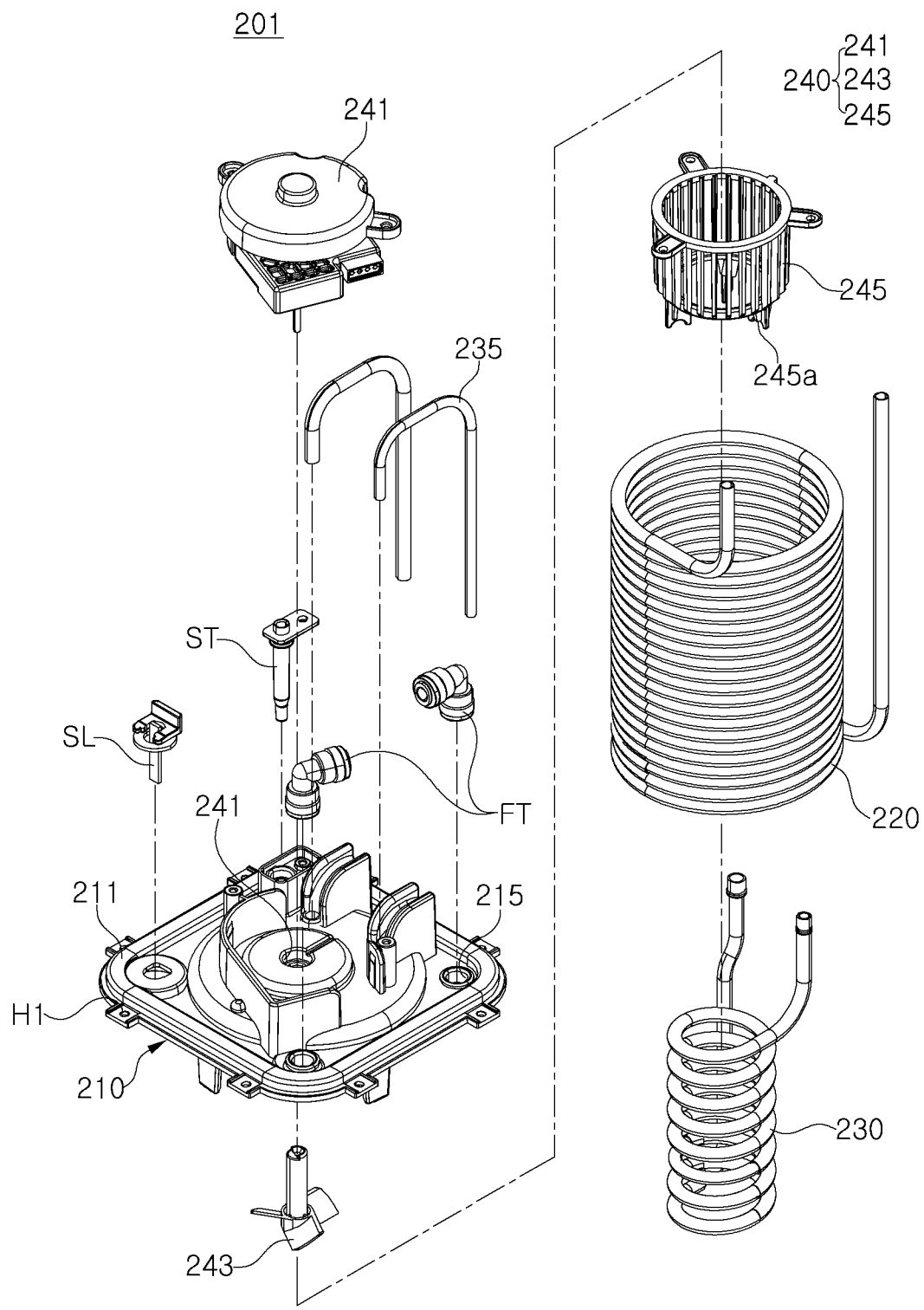
FIG. 4 is an exploded perspective view of a cover assembly of the cooling tank assembly of FIG. 3.

FIG. 1 is a perspective view of a cooling tank assembly 200 according to an embodiment of the present disclosure, FIG. 2 is a perspective view illustrating the cooling tank assembly 200 of FIG. 1 from below from the rear, FIG. 3 is an exploded perspective view of the cooling tank assembly 200 of FIG. 1, and FIG. 4 is an exploded perspective view of a cover assembly 201 of the cooling tank assembly 200 of FIG. 3.

Referring to FIGS. 1 to 4, a cooling tank assembly 200 according to an embodiment of the present disclosure may be configured to include a cooling tank 100, a cover assembly 201, and a cover thermal insulating material 250.

As illustrated in FIG. 3, the cooling tank 100 may be configured to include a tank body 110 in which a water accommodation space S1 is formed, a foaming case 130, and a foamed thermal insulating material 150, and a detailed description of the cooling tank 100 will be described later with reference to FIGS. 1 to 3 and FIGS. 5 to 11.

The cover assembly 201 may be configured to include a tank cover 210 located on the tank body 110 and combined with the tank body 110, and a cold water pipe 220, an evaporation pipe 230, and a stirring unit 240, coupled to the tank cover 210. In addition, a temperature sensor ST measuring a temperature of water accommodated in the water accommodation space S1 and a water level sensor SL measuring a water level of the water may be installed in the tank cover 210.

A plurality of openings 215 may be formed in a cover body 211 to install various components such as the cold water pipe 220, the evaporation pipe 230, the stirring unit 240, the temperature sensor ST, the water level sensor SL, or the like. Various components may be introduced into the water accommodation space S1 of the tank body 110 through the openings 215. In addition, for the fastening of the tank cover 210 and the tank body 110, a plurality of places may be screwed through a fastening port (H1 in FIG. 4) of the tank cover 210 and a fastening port (H2 in FIG. 5) of the tank body 110. In addition, a gasket (not illustrated) may be provided between the tank cover 210 and the tank body 110 to seal the tank cover 210 and the tank body 110.

The evaporation tube 230 may flow a refrigerant to cool an ice-condensed liquid accommodated in the water accommodation space S1 of the tank body 110, and may be connected to a compressor, a condenser, and an expansion valve, not illustrated, to constitute a cooling cycle (a cooling system). In the evaporation tube 230, an upper side thereof may be supported by the tank cover 210, and a lower side thereof may be supported by an evaporation tube support groove (118 in FIG. 6) formed in the water accommodation space S1 of the tank body 110. In addition, the evaporation tube 230 needs to sufficiently secure a flow path length to exchange with the ice-condensed liquid sufficiently thermally. For this purpose, the evaporation tube 230 may have a spiral shape. In addition, the refrigerant flowing through the evaporation tube 230 may be connected to the cooling system through a connection member 235 sealed to an end portion of the evaporation tube 230.

Also, the cold water pipe 220 may be disposed on an outside of the evaporation pipe 230 in the water accommodation space S1, and may have a shape surrounding the evaporation pipe 230. Like the evaporation pipe 230, the cold water pipe 220 needs to sufficiently secure a flow path length to exchange with the ice-condensed liquid sufficiently thermally. For this purpose, the cold water pipe 220 may also have a spiral shape. In addition, one side of the cold water pipe 220 may be connected to a filter unit (310 in FIG. 17), and purified water filtered by the filter unit 310 may flow through an internal space of the cold water pipe 220. Therefore, the purified water flowing through the internal space of the cold water pipe 220 may be cooled by thermal exchange with an ice-condensed liquid or an ice-condensed ice cooled by the evaporation pipe 230, and may be discharged as cold water. Moreover, an upper side of the cold water pipe 220 may be connected to the tank cover 210, and a lower side of the cold water pipe 220 may be supported by a cold water pipe support groove (119 in FIG. 6) formed in the water accommodation space S1 of the tank body 110.

In addition, the other side of the cold water pipe 220 may be connected to an extraction unit (330 in FIG. 17) through a pipe connection member (FT) and a pipe (not illustrated) coupled thereto. Therefore, the cold water discharged from the cold water pipe 220 may be provided to a user through the extraction unit 330.

Moreover, the stirring unit 240 may be configured to equalize a temperature of an ice-condensed liquid accommodated in the water accommodation space S1 of the tank body 110, to efficiently perform thermal exchange between the purified water flowing through the cold water pipe 220 and the ice-condensed liquid. The stirring unit 240 may be configured to include a motor 241 providing a rotational driving force, stirring blades 243 rotating by the driving force of the motor 241, and a circulation guide member 245 disposed to surround the stirring blades 243 on the upper side of the evaporation tube 230 and to guide circulation of the ice-condensed liquid to facilitate the circulation of the ice-condensed liquid, when the stirring blades 243 are rotated. For example, when the stirring blades 243 are rotated, the ice-condensed liquid may move to a lower side of the water accommodation space S1, may move in a radial-outward direction in the water accommodation space S1, may rise through a space between the cold water pipe 220 and an internal surface of the tank body 110, and may move in a radial-inward direction, to have a circulation path flowing into the stirring blades 243 through the circulation guide member 245.

In addition, a support groove 245a for supporting the upper side of the evaporation tube 230 may be formed on a lower surface of the circulation guide member 245. Therefore, the upper side of the evaporation tube 230 may be supported by the support groove 245a, and the lower side of the evaporation tube 230 may be supported by the evaporation tube support groove (118 in FIG. 6) formed in the water accommodation space S1 of the tank body 110. Therefore, the evaporation tube 230 may be stably supported.

An ice-condensed cooling method may be used in various forms in water purifiers, and Korea Patent Publication No. 2019-0119444 filed by the present applicant also discloses a cold water manufacturing apparatus including the same internal structure as the present disclosure. Therefore, a detailed description thereof will be omitted, and will be replaced with the description of Korea Patent Publication No. 2019-0119444.

In addition, the cover thermal insulating material 250 may be coupled to the tank cover 210 of the cover assembly 201, to insulate a portion of the tank cover 210. In addition, to connect various components such as the cold water pipe 220, the evaporation pipe 230, the stirring unit 240, the temperature sensor ST, the water level sensor SL, and the like, installed in the tank cover 210, externally, a plurality of openings 251 may be formed in the cover thermal insulating material 250 to correspond to externally exposed positions of the components, as illustrated in FIGS. 1 to 3.

Since various components may be installed in the cover assembly 201, an external shape of the cover assembly 201 may have a complicated shape. Therefore, a shape of the cover thermal insulating material 250 should also have a complicated shape. Therefore, the cover thermal insulating material 250 may be separately manufactured as expandable polystyrene (styrofoam) or the like to facilitate manufacturing of a complicated shape, and may be configured to be attached to the external surface of the cover assembly 201.

In this case, as will be described later, cold water may be accommodated in the tank body 110 located in a lower portion of the cooling tank assembly 200, and the tank cover 210 may be coupled to an upper portion of the tank body 110 and may serve only to seal the upper portion of the tank body 110. For example, since, with respect to a temperature of water according to a position of the tank body 110, a temperature of a lower portion of the tank body 110 may be low, and a temperature of an upper portion of the tank body 110 may be relatively higher than that of the lower portion due to a difference in density of water according to a temperature, cold retaining (heat insulating) performance and anti-dew condensation performance, required for the tank cover 210 coupled to the upper portion of the tank body 110 may be relatively lower than a portion of the tank body 110. In consideration thereof point, the cover thermal insulating material 250 may be formed of EPS. A cover thermal insulating material 250 according to an embodiment of the present disclosure is not limited to EPS. To realize higher cold retaining (heat insulating) performance and higher anti-dew condensation performance, a foaming space S2 may be formed between the foaming case and the tank cover 210, in a similar manner to a cooling tank 100 to be described later, and a foaming agent (FA in FIG. 14) may be injected into the foaming space S2, to configure a foamed thermal insulating material corresponding to the tank cover 210.

With respect to a cooling tank assembly 200 according to an embodiment of the present disclosure, the ice-condensed cooling method illustrated in FIGS. 1 to 4 has been described, but a cooling tank assembly 200 according to an embodiment of the present disclosure is not limited to the ice-condensed cooling method as described above, and may be configured as a tank cooling method in which water contained in a cold water tank may be directly cooled by an evaporation tube (an evaporator) 230 to generate cold water.

[Cooling Tank 100]

Next, a cooling tank 100 according to an embodiment of the present disclosure will be described with reference to FIGS. 1 to 3 and 5 to 11.

Figure 5:
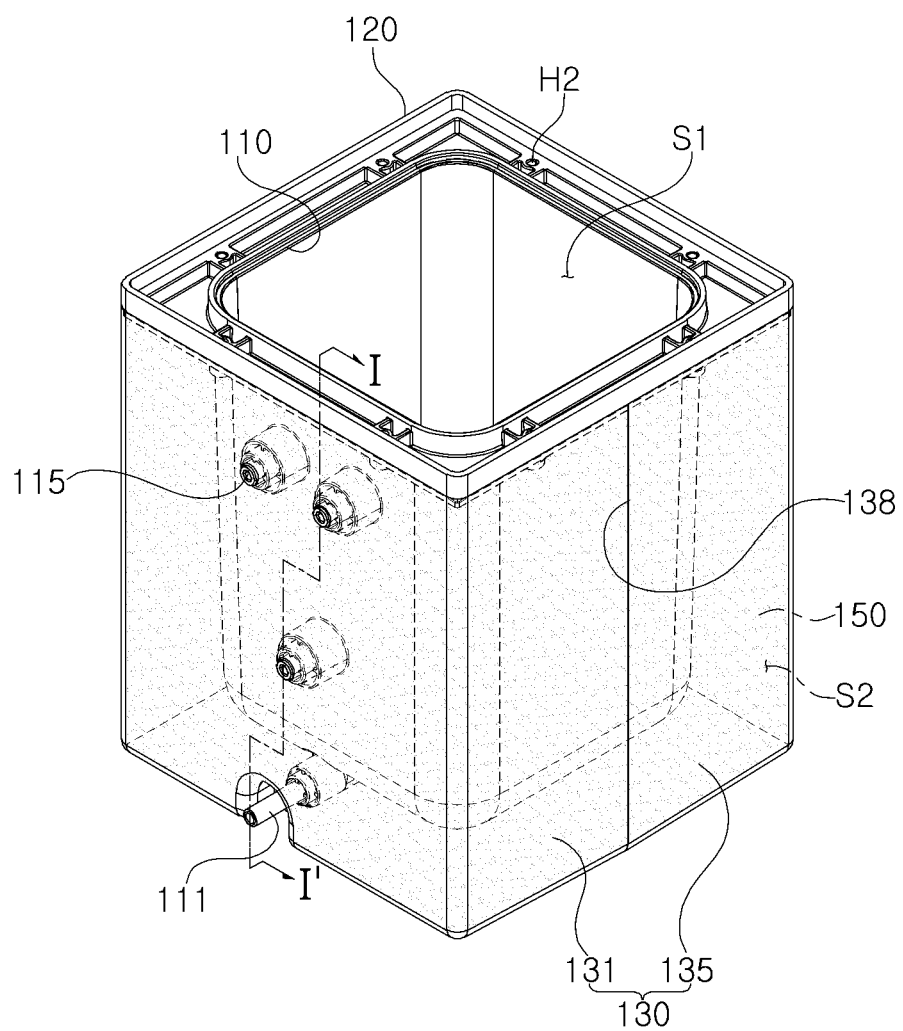
FIG. 5 is a perspective view illustrating a cooling tank in the cooling tank assembly of FIG. 3.
Figure 6:
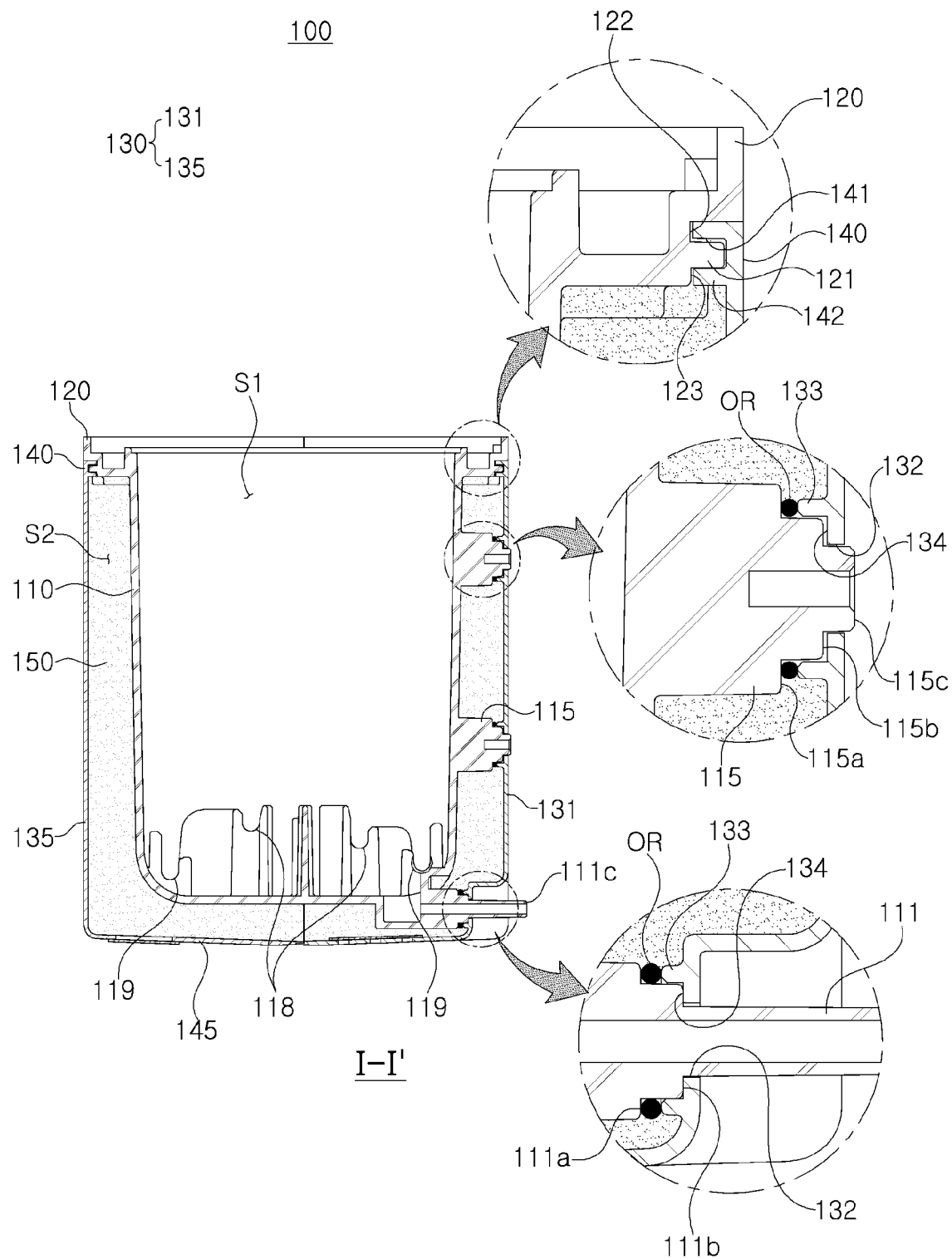
FIG. 6 is a cross-sectional view of FIG. 5, taken along line I-I'.
Figure 7:
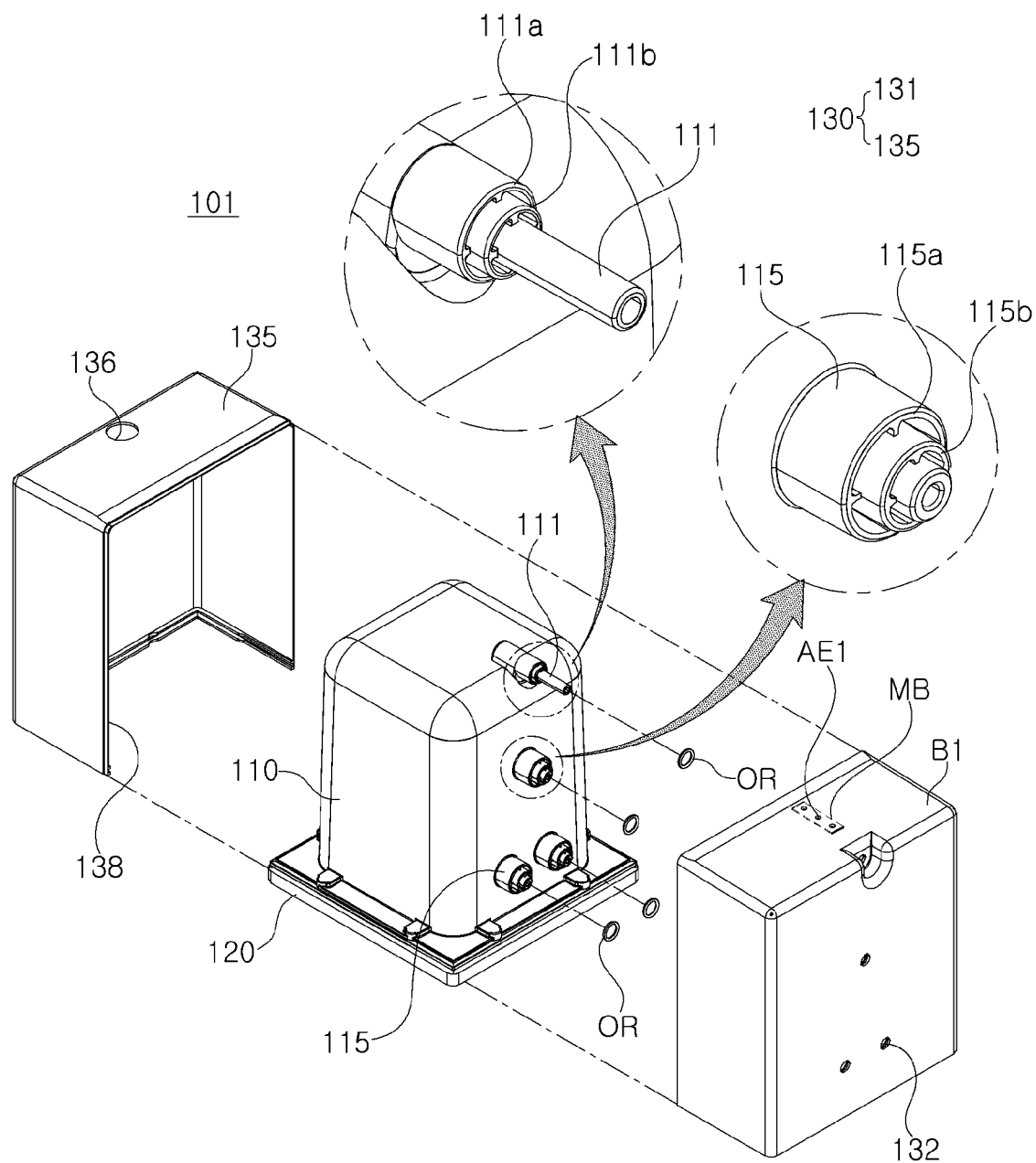
FIG. 7 is an exploded perspective view illustrating a foam assembly provided in the cooling tank of FIG. 5 from below.
Figure 8:
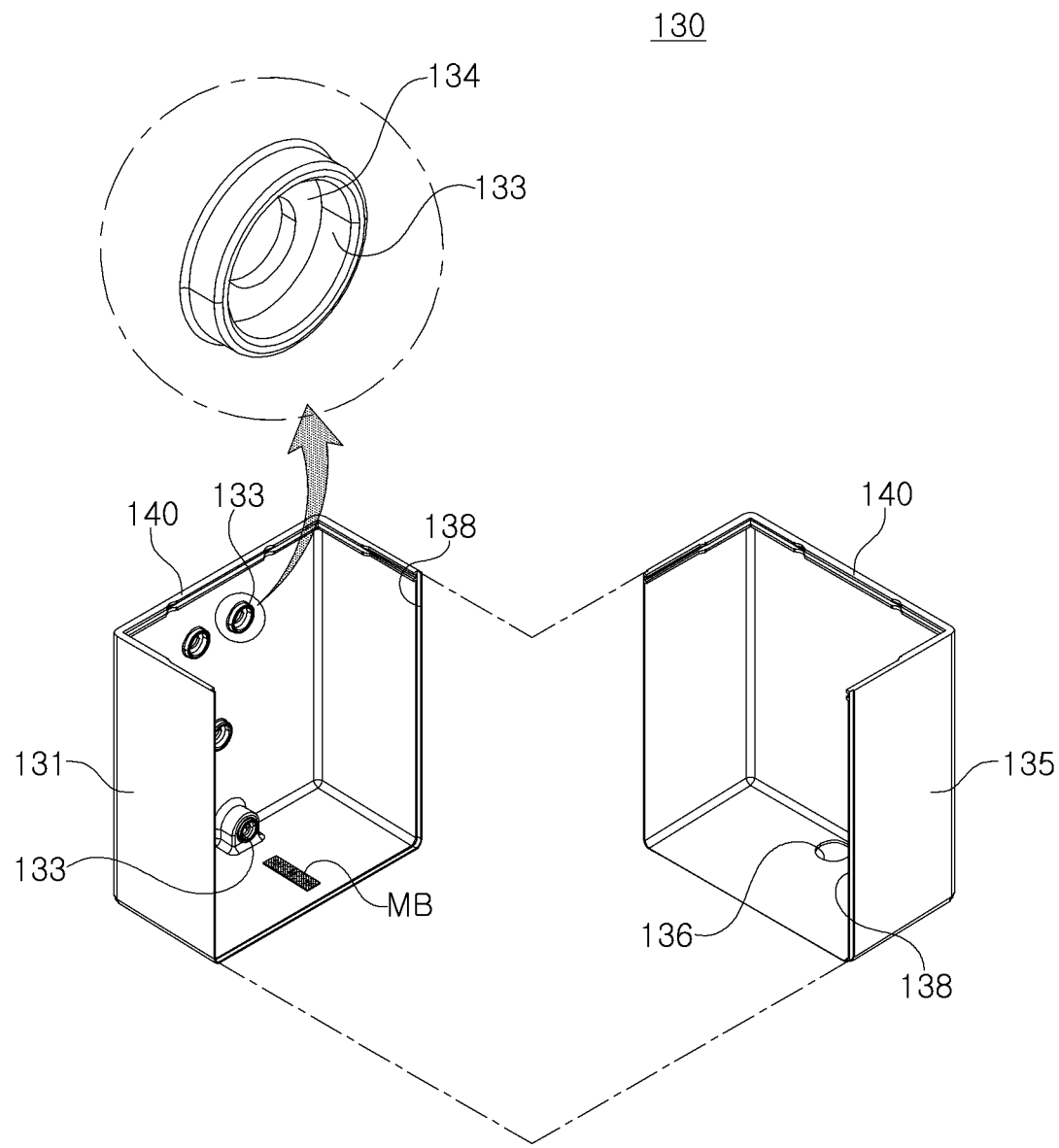
FIG. 8 is an exploded perspective view illustrating an internal space of a foaming case of the foaming assembly of FIG. 7 from above.
Figure 9:
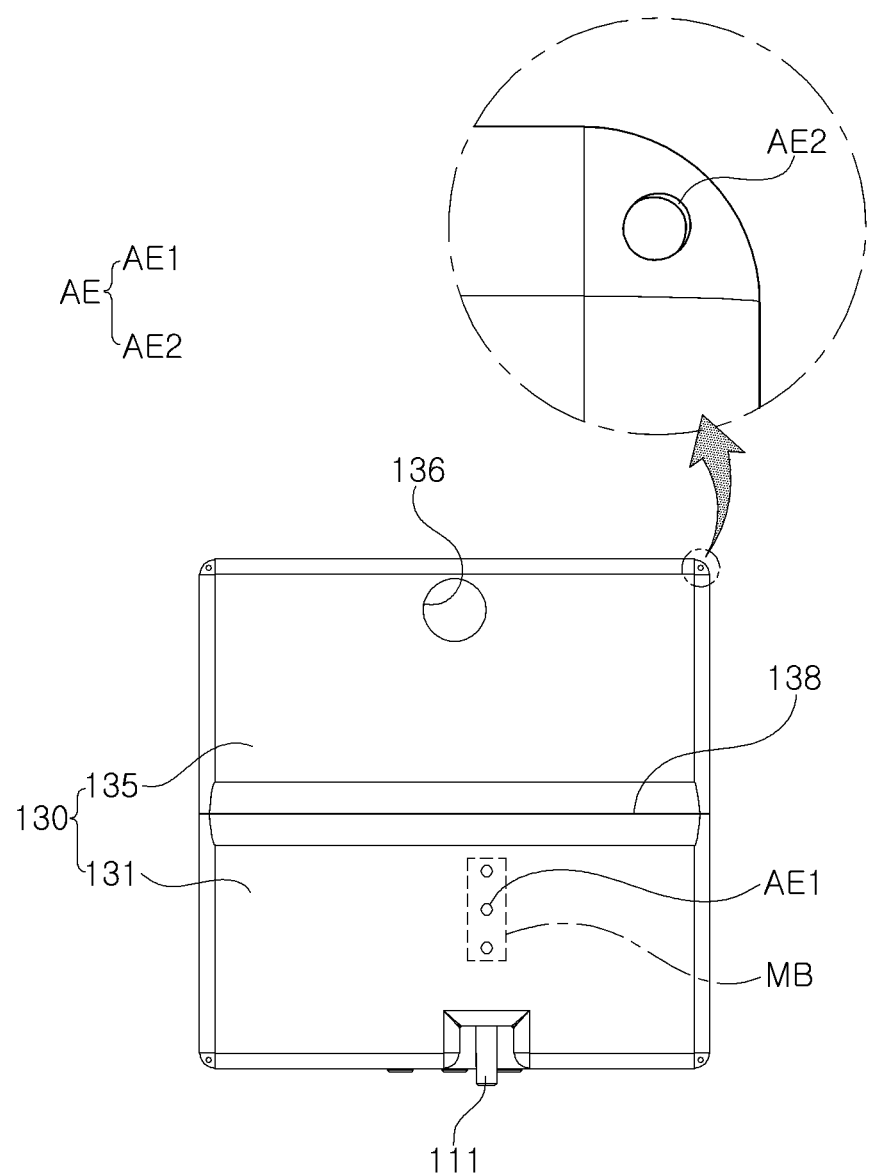
FIG. 9 is a bottom view of the foaming case of FIG. 7.

FIG. 5 is a perspective view illustrating a cooling tank 100 in the cooling tank assembly 200 of FIG. 3, FIG. 6 is a cross-sectional view of FIG. 5, taken along line I-I', FIG. 7 is an exploded perspective view illustrating a foam assembly 101 provided in the cooling tank 100 of FIG. 5 from below, FIG. 8 is an exploded perspective view illustrating an internal space of a foaming case 130 of the foaming assembly 101 of FIG. 7 from above, FIG. 9 is a bottom view of the foaming case 130 of FIG. 7, and FIGS. 10A and 10B are bottom views illustrating a modified example of the foaming case 130 of FIG. 9, and FIGS. 11A and 11B are perspective views illustrating a modified example of the foaming case 130 of FIG. 9.

Referring to FIGS. 1 to 3, and 5 to 11, a cooling tank 100 according to an embodiment of the present disclosure may be configured to include a tank body 110, a foaming case 130 and a foamed thermal insulating material 150. In addition, the tank body 110 and the foaming case 130 may be coupled to each other to form a foaming assembly 101, before a foaming agent FA is injected.

The tank body 110 may have a structure combined with a tank cover 210, as described above, and a water accommodation space S1 may be formed therein. In an ice-condensed cooling method, an ice-condensed liquid may be accommodated in the water accommodation space S1, and in a tank cooling method in which water contained in the cooling tank 100 is directly cooled by an evaporation tube (an evaporator) 230 to generate cold water, purified water may be accommodated in the water accommodation space S1.

In addition, at least one water flow port 111 through which water accommodated in the water accommodation space S1 flows into a lower portion of the tank body 110 may be formed. On a side surface of the tank body 110, to install the tank body 110 in a housing (not illustrated) of a water purifier, a bump 115 for coupling the tank body 110 to a frame (not illustrated) or the like with a bolt (a screw), may be formed. A configuration of the bump 115 is not limited to fastening of the tank body 110, and may be used for other purposes.

Moreover, the foaming case 130 may be installed to accommodate the tank body 110 therein and to surround an external peripheral surface of the tank body 110. Between an external surface of the tank body 110 and an internal surface of the foaming case 130, a foaming space S2 in which the foaming agent (FA in FIG. 14) is foamed may be formed. In addition, to accommodate the tank body 110 in the foaming case 130, the foaming case 130 may have a structure to be divided into a first case 131 and a second case 135.

A bonding member (T in FIG. 13) may be bonded to a division portion 138 divided into the first case 131 and the second case 135, to insert the foaming assembly 101, coupled to the tank body 110 and the foaming case 130 while maintaining the assembled state as described below, into a foaming jig. Since deformation of an external surface of the foaming case 130 may be limited by the foaming jig, the bonding member T may be sufficient to provide a bonding force such that the foaming case 130 is prevented from being divided, in a process of inserting the foaming assembly 101 into the foaming jig. Therefore, the bonding member T may be formed of tape attached to the division portion 138 between the first case 131 and the second case 135, but the present disclosure is not limited thereto. For example, the bonding member T may be formed of an adhesive applied to the division portion 138, and an insertedly-fastening member that enables physical coupling between the first case 131 and the second case 135 may be used. Also, various other modifications thereof are possible.

In addition, a configuration in which the first case 131 and the second case 135 overlap is possible, such that the foaming agent FA does not leak from the division portion 138 externally during a foaming process.

In addition, the foamed thermal insulating material 150 may be formed by introducing and foaming the foaming agent FA into a foaming space between the external peripheral surface of the tank body 110 and the foaming case 130. Therefore, the foamed thermal insulating material 150 may be integrated with the tank body 110 and the foaming case 130 by the foaming process.

In this case, the foaming agent FA may be a foaming liquid capable of forming a urethane (polyurethane) foam. The urethane (polyurethane) foam may use polyurethane, obtained by reaction of an isocyanate compound with glycol, as a material, and may refer to a foamed product usually formed by mixing carbon dioxide, generated by reaction of isocyanate and water as a crosslinking agent, and a volatile solvent such as Freon as the foaming agent FA. The urethane foam may have various levels of hardness such as super soft, soft, semi-hard, hard, or the like, depending on a type of glycol, a raw material to be used. When the foaming agent FA used in the present disclosure forms a urethane foam, various changes is possible in composition and manufacturing method of the urethane foam. In addition, the foamed thermal insulating material 150 provided in the cooling tank 100 of the present disclosure is not limited to urethane foam, and various types of known foaming agents may be used, when the tank body 110 is accommodated in the foaming case and uniform foaming is effected between the foaming case and the external surface of the tank body 110.

An injection port 136 for injection of the foaming agent FA, and an air outlet AE through which air in the foaming space S2 is discharged during the foaming process may be formed in the foaming case 130. In this case, the injection port 136 may be formed adjacent to one side of the foaming case 130, and may be formed to have a size necessary for an injection operation. The injection port 136 may be completely cut to form a through-hole, but may be partially cut to form a cutout 137, as illustrated in FIG. 10B. As illustrated in FIG. 10B, the cutout 137 may be folded in an injection direction, when the foaming agent FA is injected, and the cutout 137 may move in an opposite direction (in an outward direction) to have a structure in which the injection port 136 is closed.

Moreover, the air outlet AE may include a main outlet AE1 opposing the injection port 136 and formed adjacent to the other side of the foaming case 130. When the main outlet AE1 is installed in a direction, opposite to the injection port 136, a large amount of air may be discharged through the main outlet AE1. Therefore, foaming toward the main outlet AE1 may be smoothly performed. In addition, the main outlet AE1 may be installed adjacent to a complicated shape of the foaming case 130. For example, as illustrated in FIG. 9, the main outlet AE1 may be installed eccentrically toward the water flow port 111 from a central portion, rather than the central portion of the foaming case 130, such that air is discharged from a portion adjacent to the water flow port 111 to effectuate sufficient foaming around the water flow port 111 having a complex shape. As illustrated in FIG. 10A, the main outlet AE1 may be also located in the central portion, corresponding to the injection port 136 disposed in the central portion of the foaming case 130.

In addition, since the main outlet AE1 has a relatively large size, among the air outlets AE, a shielding film member MB may be used to block the main outlet AE1. In this case, the shielding film member MB may be formed of a material preventing leakage of the foaming agent FA during the foaming process, and allowing air to be discharged. As an example of the shielding film member MB, a non-woven fabric or a mesh network having a small gap may be used.

The material of the shielding film member MB may not be limited thereto, and various materials and types of members may be used as long as it is possible to discharge air and prevent leakage of the foaming agent FA. In addition, the shielding film member MB may be attached to an internal surface of the foaming case 130. Since the foaming case 130 may be supported by the foaming jig during the foaming process, the shielding film member MB may be attached to an external surface of the foaming case 130.

Figure 10:
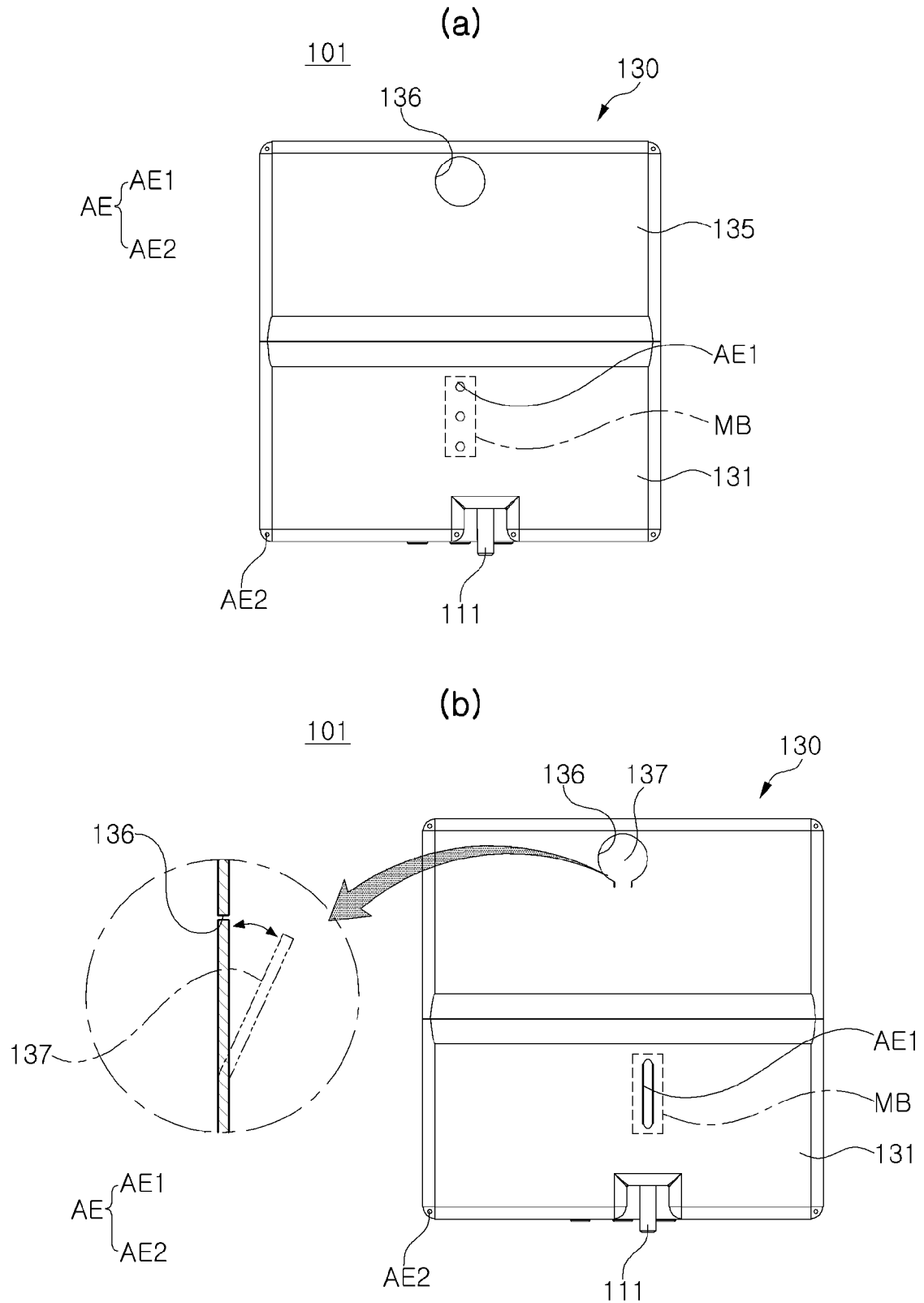
FIGS. 10A and 10B are bottom views illustrating a modified example of the foaming case of FIG. 9.
Figure 11:
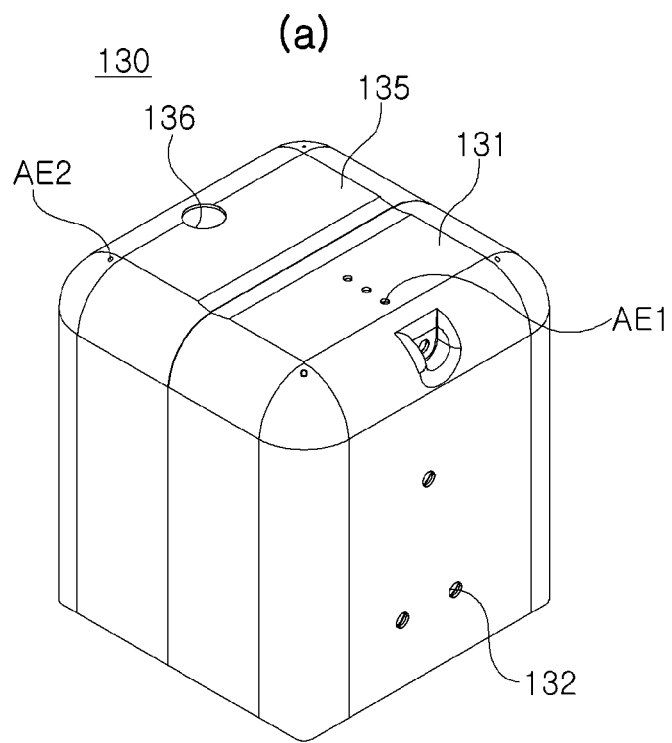
FIGS. 11A and 11B are perspective views illustrating a modified example of the foaming case of FIG. 9.
Figure 11:
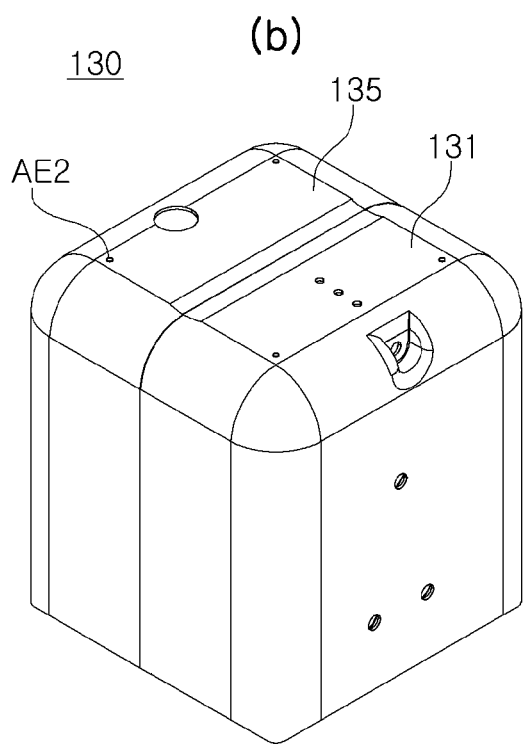

Since a foaming pressure of the foaming agent FA may be very high during the foaming process, to sufficiently resist the main outlet AE1 and/or the shielding film member MB against leakage of the foaming agent FA, it is preferable that the main outlet AE1 may be provided as a plurality of main outlets AE1 having small sizes, as illustrated in FIGS. 9, 10A, and the like. As such, to easily discharge air, the main outlet AE1 may have a diameter of approximately 4 mm to 15 mm, more preferably 4 to 10 mm. Also, the number of the main outlets AE1 may be three or more. However, as illustrated in FIG. 10 (b), the main discharge port AE1 may have a slot shape formed to be long and thin.

The air outlet AE may further include a corner outlet AE2 located at a corner of the foaming case 130. When only the main outlet AE1 is provided in the foaming case 130, air flow may be low at the corner of the foaming case 130, and thus, a non-foamed region (an unfilled region) may be likely to occur in a corner portion. In consideration thereof point, it is possible to install the corner outlet AE2 in the corner of the foaming case 130. According to the inventor's experiment, it can be confirmed that, foaming of the corner portion may be sufficiently effectuated when installing the corner outlet AE2 in a region, adjacent to the corner (a vertex) of the foaming case 130, as compared to installing a plurality of outlets in the corner portion.

When the corner outlet AE2 is formed to be large, the foaming agent FA may leak through the corner outlet AE2 during the foaming process. Therefore, it may be necessary to install the shielding film member MB at the corner outlet AE2 as well. To block the corner outlet AE2 formed at each corner, it may be cumbersome to install the plurality of shielding film members MB. In consideration thereof, the corner outlet AE2 may have a diameter of about 1 mm, preferably a range between 0.3 to 2.0 mm, more preferably a range between 0.5 and 1.5 mm, such that air is discharged but leakage of a foamed foaming agent FA is prevented. In addition, each of the corner outlets AE2 may be formed at each corner.

Since the corner outlet AE2 may be formed on a curved surface of the corner, it may not be easy to form the corner outlet AE2 by punching using a mold. In consideration thereof point, as illustrated in FIG. 11B, the corner outlet AE2 may be also located in a planar region, adjacent to the corner. In addition, in FIGS. 11A and 11B, a radius of curvature of the corner portion may increase to smoothly effectuate foaming of the foaming agent FA in the corner portion. As in FIG. 11B, even when the corner outlet AE2 is located in the planar region, adjacent to the corner, an unfilled (non-foamed) region may not occur in the corner of the foaming case 130.

Moreover, since the foaming case 130 may be formed of a plastic material such as PE or PP, it may be easy to form the foaming case 130 and the foaming case 130 may have a smooth surface. Therefore, a surface of the foaming case 130 may be easily cleaned. For example, even when dew condensation (generated condensed water) occurs on the surface of the foaming case 130 or there are contaminants such as mold or the like, cleaning thereof may be easily effectuated, and the contaminants may be prevented from moving into the foamed thermal insulating material 150 located in the foaming case 130.

In addition, as illustrated in FIG. 6, the foaming case 130 may have a downward inclined slope in a direction toward a center from an external side of a lower surface 145, and, even when condensed water occurs on the surface of the foaming case 130, may be configured to gather and move downwardly the condensed water around the center of the lower surface 145, to reduce a residual portion of the condensed water on the surface of the foaming case 130.

Referring to FIGS. 6 to 8, sealing may be made between a coupling portion of the foaming case 130 and the tank body 110. Through this sealing structure, it is possible not only to prevent the foaming agent FA from leaking externally during the foaming process of the foaming agent FA, but also to completely block the external surface of the foaming case 130 and the foamed thermal insulating material 150, after curing of the foaming agent FA is completed to form the foamed thermal insulating material 150.

The tank body 110 may include a tank edge portion 120 corresponding to an open region, and the foaming case 130 may include a case edge portion 140 corresponding to the tank edge portion 120. In this case, it may be necessary to prevent leakage of the foaming agent FA at a boundary between the tank edge portion 120 and the case edge portion 140. To prevent the leakage of the foaming agent FA at the boundary between the tank edge portion 120 and the case edge portion 140, the tank edge portion 120 and the case edge portion 140 may have a structure in which they are insertedly fastened to each other. Specifically, as illustrated in FIG. 6, the tank edge portion 120 may include a protruding portion 121 protruding toward the case edge portion 140, and the case edge portion 140 may include a receiving portion 141 formed between protruding portions 142, such that the protruding portion 121 is insertedly fastened therebetween. For example, upper and lower surfaces of the protruding portion 121 of the tank edge portion 120 may be in contact with an internal side surface of the receiving portion 141 formed by the protruding portions 142 of the case edge portion 140, to form a 'U'-shaped contact structure between the tank edge portion 120 and the case edge portion 140. A protruding portion 142 located on an upper portion of the receiving portion 141 may form a 'U'-shaped contact structure between the protruding portion 142 and the tank edge portion 120 by contacting upper and lower surfaces of the protruding portion 142 with an internal side surface of a recessed portion 122 of the tank edge portion 120. In addition, a protruding portion 142 located on a lower portion of the receiving portion 141 may have a structure contacting a stepped portion 123 of the tank edge portion 120. As such, it is possible to reliably prevent leakage of the foaming agent FA in a foaming operation through the contact structure between the tank edge portion 120 and the case edge portion 140, having a multistepped zigzag shape, as well as to block flow of external air through the boundary between the tank edge portion 120 and the case edge portion 140 as much as possible, in a state in which curing of the foaming agent FA is completed. For a better sealing structure, a sealing member to be described later may be additionally installed between the protruding portion 121 and the receiving portion 141 or between the protruding portion 142 and the recessed portion 122.

Moreover, the tank body 110 may include a water flow port 111 protruding toward the foaming case 130 to enable flow of water accommodated in the water accommodation space S1. A sealing member OR in close contact with the foaming case 130 may be installed on an external surface of the water flow port 111 to seal the foaming space S2 from an external space. In addition, to form a multistepped contact structure between the water flow port 111 and the foaming case 130, the water flow port 111 may have a stepped structure in which a first stepped portion 111a, a second stepped portion 111b, and an end portion 111c, having gradually smaller diameters in an external side direction of the tank body 110, are sequentially formed. In response to this, a through-hole 132 may be formed in the foaming case 130 to expose the end portion 111c of the water flow port 111 externally. A seating surface 134 corresponding to the second stepped portion 111b may be formed around the through-hole 132. A seating bump 133 protruding toward the tank body 110 to correspond to the first stepped portion 111a may be provided around the seating surface 134. In this case, the sealing member OR may be inserted between the first stepped portion 111a and the seating bump 133, to realize sealing between the water flow port 111 and the foaming case 130.

In addition, the tank body 110 may include a bump 115 protruding from the tank body 110 toward the foaming case 130, and may fasten the tank body 110 to a frame (not illustrated) in a housing (not illustrated) through the bump 115. In this case, a sealing member OR in close contact with the foaming case 130 may be installed on an external surface of the bump 115 to seal the foaming space S2 from an external space. In addition, to form a multistepped contact structure between the bump 115 and the foaming case 130, the bump 115 may have a stepped structure in which a first stepped portion 115a, a second stepped portion 115b, and an end portion 115c, having gradually smaller diameters in an external side direction of the tank body 110, are sequentially formed. In response to this, a through-hole 132 may be formed in the foaming case 130 to expose the end portion 115c of the bump 115 externally. A seating surface 134 corresponding to the second stepped portion 115b may be formed around the through-hole 132. A seating bump 133 protruding toward the tank body 110 to correspond to the first stepped portion 115a may be provided around the seating surface 134. In this case, the sealing member OR may be inserted between the first stepped portion 115a and the seating bump 133, to realize sealing between the bump 115 and the foaming case 130.

A foamed thermal insulating material 150 may be formed by foaming the foaming agent FA injected into a space between the foaming case 130 and the tank body 110. It could be seen by the present inventors that a difference in performance depends on an injection amount of the foaming agent FA.

[Table 1] illustrates results of tests obtained by performing the tests including, to form a polyurethane foam, using a material mixed with BILLYOL (RF-334T) and ECO FOAM-A in a certain ratio (1:1.1) as an example of a foaming agent FA, and using a urethane high pressure foaming machine (not illustrated), while changing injection time (sec) of the foaming agent FA. A temperature of a foaming jig was maintained at 40° C., and a foaming-curing time period was given by 20 minutes to achieve complete curing.

In [Table 1], a weight was measured by cutting a size of a specimen for a foamed thermal insulating material 150 into 50 mm*50 mm*17 mm for each of the tests, and a density was a value calculated from the measured weight and a volume of the specimen.

In addition, to measure thermal insulation performance and anti-condensation performance, measurements were made after leaving the specimen under dew condensation conditions in summer in a room having a temperature of 35° C. and a relative humidity of 93%.

A remaining ice amount (g) for measuring the thermal insulation performance was a result of measuring an amount of ice remaining after 1.5 days after adding 2000 g of ice. A dew condensation amount (g) for measuring the anti-condensation performance was a result of measuring an amount of dew remaining after 1 day after continuously adding ice water (measurement results mainly from side surfaces thereof).

In addition, foaming quality was visually determined to see whether a non-foamed region had occurred. Moreover, EPS in far right boxes of [Table 1] was a result of measurement using EPS including the same shape and volume as the foamed thermal insulating material 150.

TABLE 1

|  | Comparative Example 1 | Comparative Example 2 | Inventive Example 1 | Inventive Example 2 | Inventive Example 3 | Comparative Example 3 | EPS |
|---|---|---|---|---|---|---|---|
| Injection Time (sec) of Foaming Agent | 1.0 | 1.1 | 1.3 | 1.5 | 1.7 | 1.8 | |
| Weight (g) | 2.2 | 2.4 | 2.8 | 3.2 | 3.6 | 4.0 | |
| Density (g/cm$^3$) | 0.0518 | 0.0565 | 0.0659 | 0.0753 | 0.0847 | 0.0941 | |
| Remaining Ice Amount [g] | 439 | 432 | 427 | 412 | 406 | 404 | 372 |
| Dew Condensation Amount [g] | 52 | 52 | 57 | 63 | 65 | 66 | 65 |
| Foaming Quality | Non-foamed Region Occurred | Non-foamed Region Occurred | Good | Good | Good | Good | |

As illustrated in [Table 1], the remaining ice amount (g) was showed to tend to decrease, as a density of the foamed thermal insulating material 150 in which curing was completed increases. In this case, it can be seen that amounts of pores in the foamed thermal insulating material 150 are not large, and heat transfer, similar to conduction, was performed, in a similar manner to plastics, to reduce a cooling effect (a thermal insulation effect), when the density of the foamed thermal insulating material 150 was high. It can be confirmed that thermal insulation performance in using a foaming case 130 was superior to thermal insulation performance in using EPS.

In addition, as illustrated in [Table 1], the dew condensation amount (g) was showed to tend to increase, as a density of the foamed thermal insulating material 150 in which curing was completed increases, and was believed that this was because amounts of pores in the foamed thermal insulating material 150 are not large, like the thermal insulation performance, when the density of the foamed thermal insulating material 150 was high.

As illustrated in [Table 1], when the density of the foamed thermal insulating material 150 was low (Comparative Example 1 and Comparative Example 2), a foaming amount and a foaming pressure were not sufficient. In these cases, foaming was not occurred in some regions.

As such, when the density of the foamed thermal insulating material 150 was less than 0.065 g/cm³ (Comparative Example 1 and Comparative Example 2), thermal insulation performance and anti-condensation performance were excellent, but there was a non-foamed region. In the non-foamed region, dew condensation may occur in an internal region of the foaming case 130, and contamination such as mold or the like may occur due to such dew condensation (generated condensed water). When the density of the foamed thermal insulating material 150 was greater than 0.085 g/cm³ (Comparative Example 3), it can be seen that thermal insulation performance and anti-condensation performance were deteriorated.

Therefore, the density of the foamed thermal insulating material 150 may be in a range of 0.065 to 0.085 g/cm³, comprehensively considering the thermal insulation performance, the anti-condensation performance, and the foaming quality (Inventive Examples 1 to 3).

[Method of Manufacturing Cooling Tank 100 (S100)]

Next, a method (S100) of manufacturing a cooling tank 100 according to an aspect of the present disclosure will be described with reference to FIGS. 12 to 17.

Figure 12:
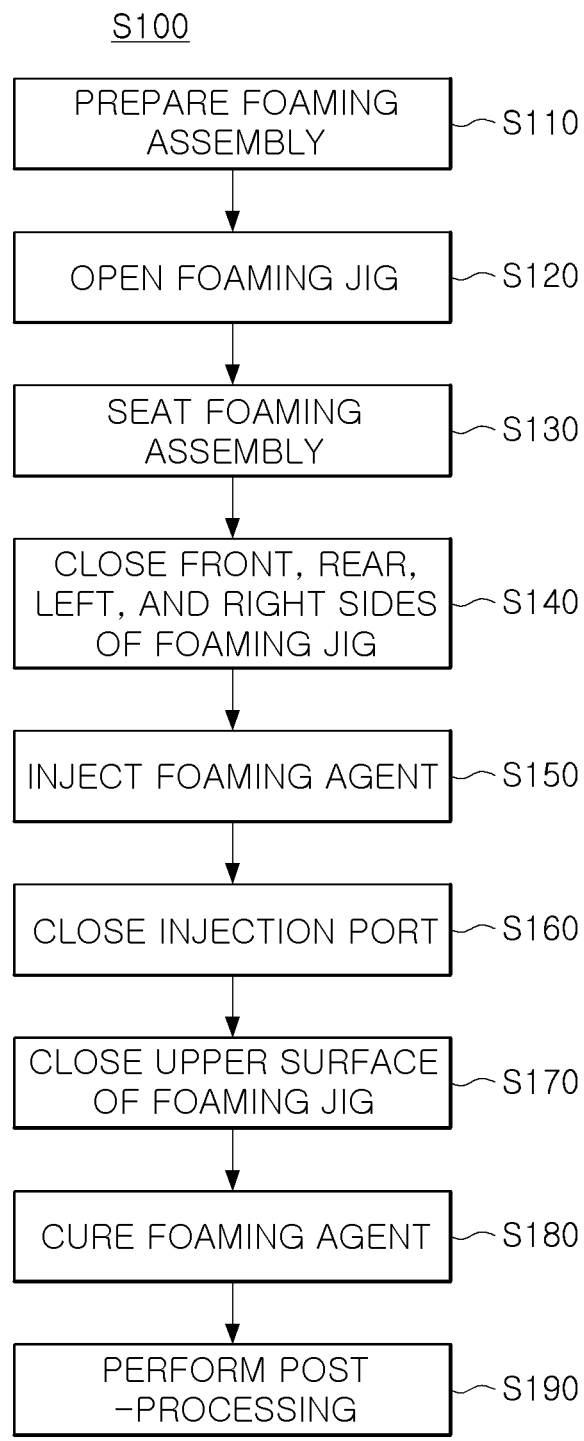
FIG. 12 is a flowchart illustrating a method of manufacturing a cooling tank according to an embodiment of the present disclosure.
Figure 13:
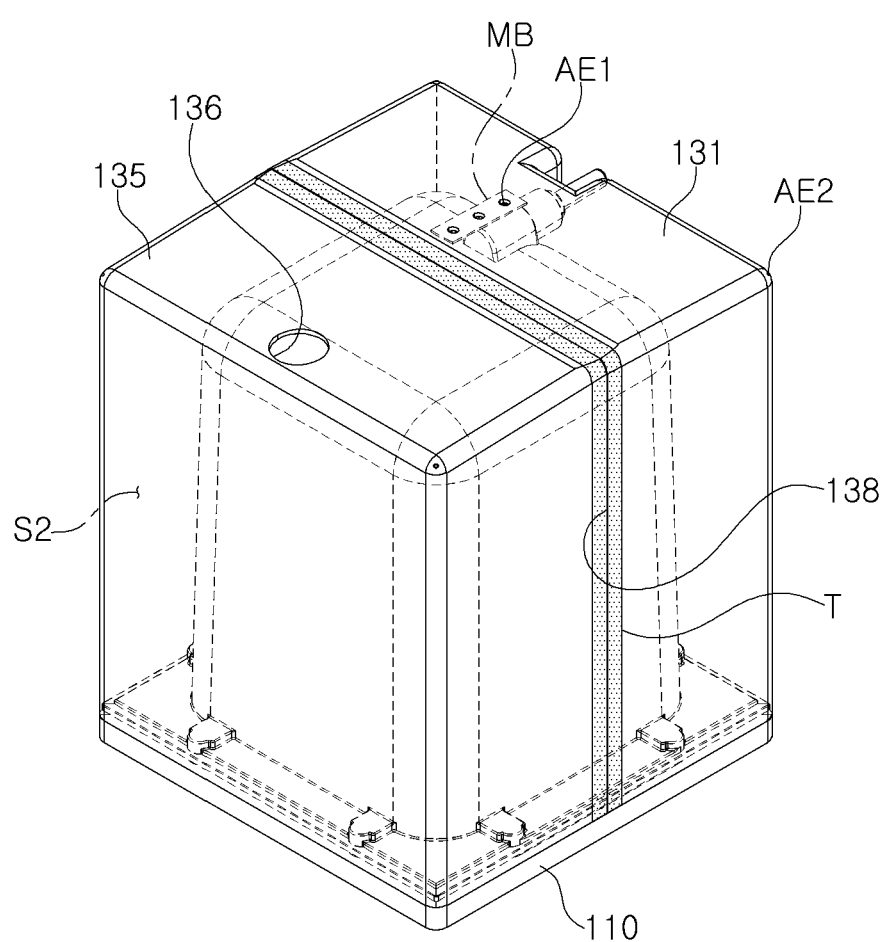
FIG. 13 is a perspective view illustrating a state of the foaming assembly of FIG. 12 in a preparation operation of the foaming assembly.
Figure 14:
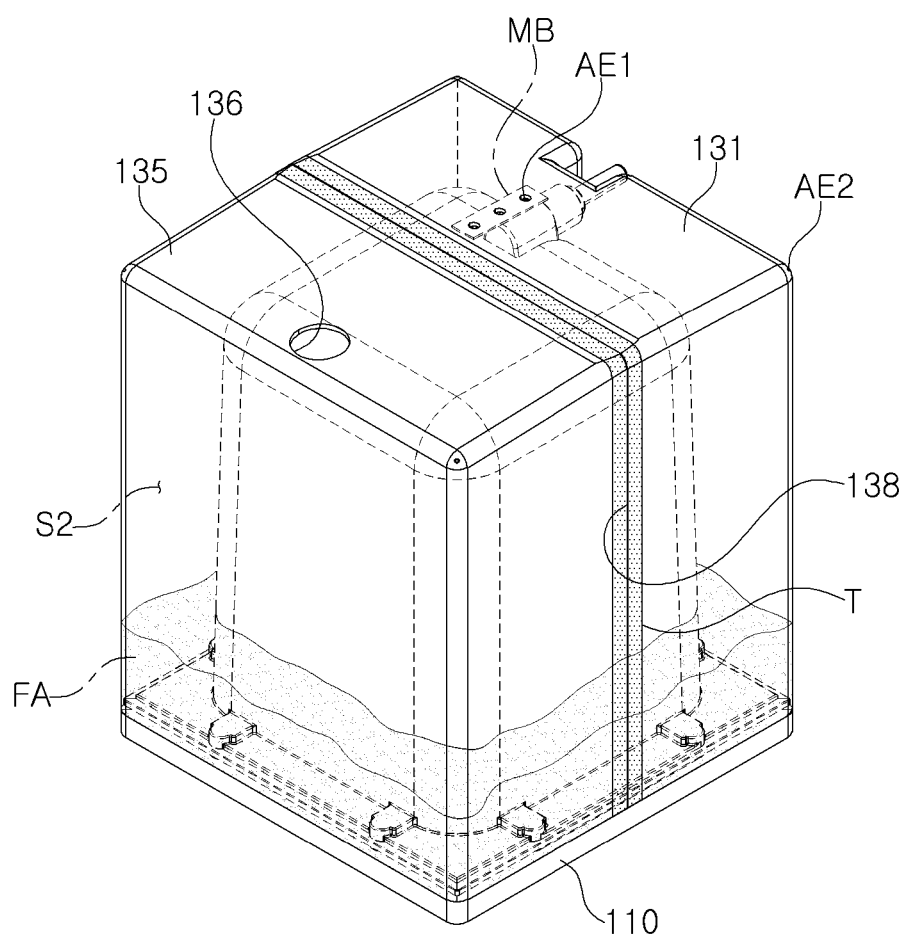
FIG. 14 is a perspective view illustrating a state of the foaming assembly of FIG. 12 in an injection operation of injecting a foaming agent.
Figure 15:
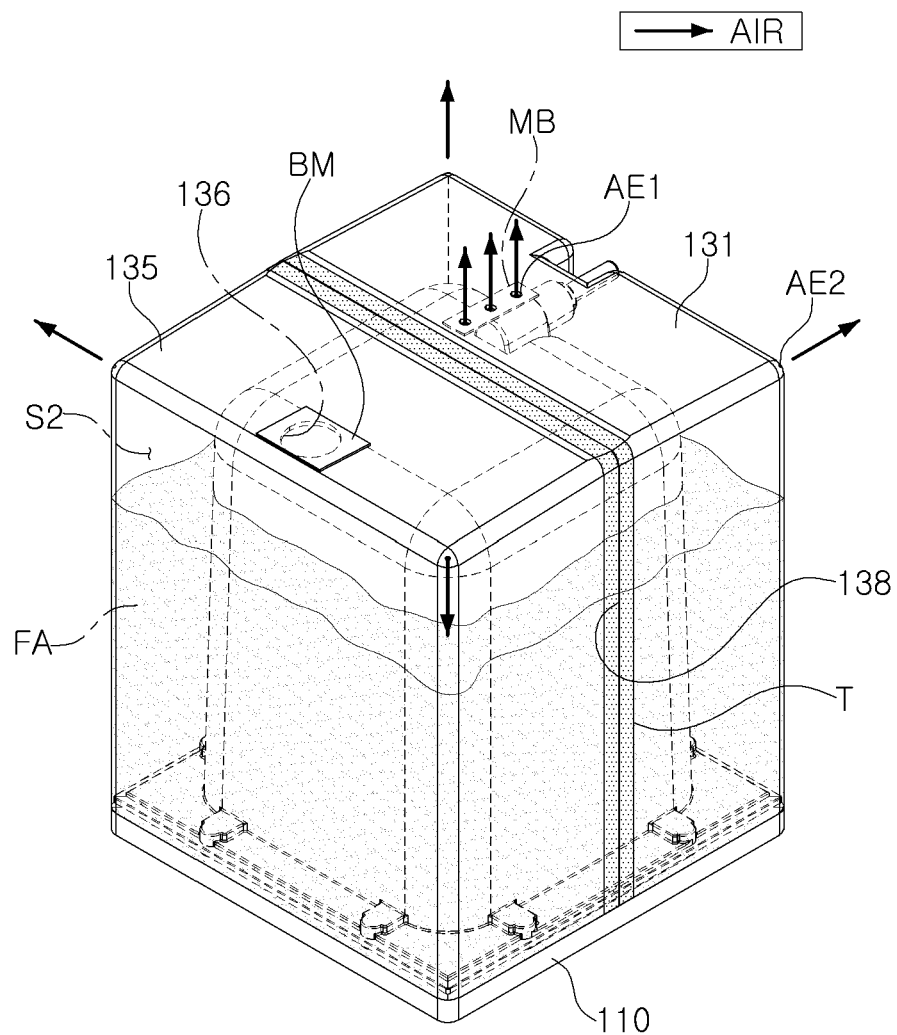
FIG. 15 is a perspective view illustrating a state of the foaming assembly of FIG. 12 in an injection port closing operation.
Figure 16:
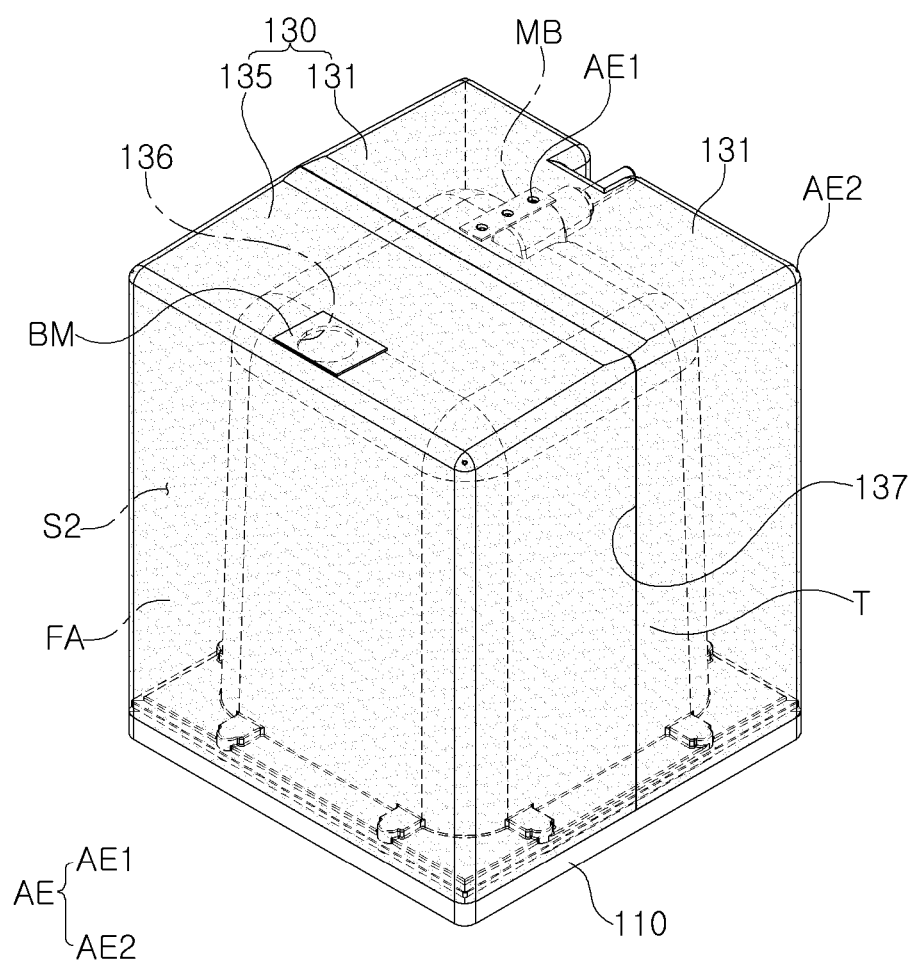
FIG. 16 is a perspective view of a cooling tank manufactured by completing a foaming-curing operation of the foaming agent of FIG. 12.

FIG. 12 is a flowchart illustrating a method (S100) of manufacturing a cooling tank 100 according to an embodiment of the present disclosure, FIG. 13 is a perspective view illustrating a state of the foaming assembly 101 of FIG. 12 in a preparation operation (S110) of the foam assembly 101, FIG. 14 is a perspective view illustrating a state of the foaming assembly 101 of FIG. 12 in an injection operation (S150) of injecting a foaming agent, FIG. 15 is a perspective view illustrating a state of the foaming assembly 101 of FIG. 12 in an injection port closing operation (S160), and FIG. 16 is a perspective view of a cooling tank 100 manufactured by completing a foaming-curing operation (S180) of the foaming agent of FIG. 12.

As illustrated in FIG. 12, a method of manufacturing a cooling tank 100 according to an embodiment of the present disclosure may be configured to include a seating operation (S130) of seating a foaming assembly 101 on a foaming jig, a partial closing operation (S140) of closing front, rear, left, and right sides of the foaming jig, an injection operation (S150) of injecting a foaming agent FA, an upper surface closing operation (S170) of closing an upper surface of the foaming jig, and a foaming-curing operation (S180) in which the foaming agent FA is foamed and cured, and may further include at least a portion of a preparation operation (S110) of preparing the foaming assembly 101, an opening operation (S120) of opening a foaming jig (not illustrated), an injection port (136) closing operation (S160) of closing an injection port 136, or a post-processing operation (S190) of post-processing and/or inspecting a cured cooling tank 100.

A preparation operation (S110) of preparing the foaming assembly 101 may be performed by coupling a tank body 110 and a foaming case 130 to form a foaming space S2 between the tank body 110 and the foaming case 130, as illustrated in FIG. 7. In this case, protruding portions 111 and 115 provided in the tank body 110, for example, a water flow port 111 and a bump 115 may have an end portion exposed from an external surface of the foaming case 130, through a through-hole 132 provided in the foaming case 130. In addition, the water flow port 111 and the bump 115 may be seated on a seating surface 134 and a seating bump 133 formed around the seating surface 134 in the foaming case 130. To seal between the tank body 110 and the foaming case 130, a sealing member OR may be installed on an external peripheral surface on which a step difference between the water flow port 111 and the bump 115 is formed. The sealing member OR may be formed as an O-ring, as illustrated in FIG. 6. In addition, the sealing member OR may be installed between a first stepped portion (111a and 115a) and the seating bump 133, not only to prevent the foaming agent FA from leaking externally when the foaming agent FA is foamed, as will be described later, but also to completely block an external surface of the foaming case 130 and a foamed thermal insulating material 150, after curing of the foaming agent FA is completed to form the foamed thermal insulating material 150.

The preparation operation (S110) of preparing the foaming assembly 101 may include shielding a main outlet AE1 having a relatively large size, among air outlets AE using a shielding film member MB. In this case, the shielding film member MB may be formed of a material preventing leakage of the foaming agent FA and allows air to be discharged, and a nonwoven fabric may be used as an example thereof. The material of the shielding film member MB is not limited thereto, and various materials and types of members may be used as long as it is possible to discharge air and prevent leakage of the foaming agent FA. In addition, the shielding film member MB may be attached to an internal surface of the foaming case 130, but since the foaming case 130 may be supported by the foaming jig during a foaming process, the shielding film member MB may be attached to the external surface of the foaming case 130.

The foaming case 130 may have a structure to be divided into a first case 131 and a second case 135 to accommodate the tank body 110 therein. Therefore, an operation of bonding a bonding member T to a division portion 138 corresponding to an interface between the first case 131 and the second case 135 may be included, not to divide the first case 131 and the second case 135.

In the foaming-curing operation (S180) to be described later, since deformation of the external surface of the foaming case 130 may be limited by the foaming jig, the bonding member T may be sufficient to provide a bonding force preventing the foaming case 130 from being separated from each other, in a process of inserting the foaming assembly 101 into the foaming jig. Therefore, the bonding member T may be formed of a tape attached to the division portion 138 between the first case 131 and the second case 135, but the present disclosure is not limited thereto. For example, the bonding member T may be composed of an adhesive applied to the division portion 138, and an insertedly-fastening member that enables physical coupling between the first case 131 and the second case 135 may be used. Also, various other modifications thereof are possible.

Next, the opening operation (S120) of opening a foaming jig may open a space into which the foaming assembly 101 is inserted to seat the foaming assembly 101 on the foaming jig. In this case, the foaming jig may have a structure to be divided in plural, to have an internal surface corresponding to an external shape of the foaming assembly 101. A shape of the foaming jig and the number of portions of the foaming jig to be divided may be changed, depending on a shape of the foaming assembly 101. For example, when the foaming assembly 101 has a cylindrical shape, a shape by which a peripheral surface and upper and lower surfaces of the cylindrical shape are supported, and a divided structure thereof may be included. For convenience of description, a case in which a foaming assembly 101 has a hexahedral shape and a foaming jig has a six-sided support structure corresponding thereto will be described below. As illustrated in FIG. 13, when the foaming assembly 101 has a hexahedral shape, the foaming jig may have a divided structure supporting six, i.e., front, rear, left, right, upper, lower surfaces of the foaming assembly 101. Therefore, in the opening operation (S120), an upper surface of the foaming jig may be opened and front, rear, left, and right surfaces of the foaming jig may be at least partially spaced apart from the foaming assembly 101, such that the foaming assembly 101 is easily inserted into the foaming jig. In this case, the front, rear, left, and right surfaces of the foaming jig may rotate with respect to a lower portion thereof, and an upper portion thereof may be opened to spread in an outward direction, but the present disclosure is not limited thereto. A structure in which the front, rear, left, and right surfaces of the foaming jig collectively move in the outward direction with respect to the foaming assembly 101 may be included.

In the seating operation (S130) of seating a foaming assembly 101 on a foaming jig, the foaming assembly 101 may be seated on the foaming jig through an open upper surface of the foaming jig.

When the foaming assembly 101 is seated on the foaming jig, the partial closing operation (S140) of closing a portion of the foaming jig may be performed. In the partial closing operation (S140), the front, rear, left, and right surfaces of a foaming jig opened in the opening operation (S120) may be in contact with external peripheral surfaces of the foaming assembly 101 on front, rear, left, and right sides, to support the external peripheral surfaces of the foaming assembly 101. Therefore, deformation of the foam assembly 101 may be prevented during foaming of the foaming agent FA in the foaming-curing operation (S180) to be described later.

Thereafter, the injection operation (S150) of injecting a foaming agent FA into the foaming assembly 101 may be performed. In the injection operation (S150), the foaming agent FA may be injected through the injection port 136 of the foaming case 130, as illustrated in FIG. 14. In this case, the foaming agent FA may be a foaming liquid capable of forming a urethane (polyurethane) foam. The urethane (polyurethane) foam may use polyurethane, obtained by reaction of an isocyanate compound with glycol, as a material, and may refer to a foamed product usually formed by mixing carbon dioxide, generated by reaction of isocyanate and water as a crosslinking agent, and a volatile solvent such as Freon as the foaming agent FA. The urethane foam may have various hardness such as super soft, soft, semi-hard, hard, or the like, depending on a type of glycol, a raw material to be used. In addition, as a foam molding method, a one-shot method and a prepolymer process may be used. Among them, the prepolymer method may be a method of reacting a portion of glycol with diisocyanate in advance to prepare a prepolymer (partial polymerization agent), mixing and foaming remaining portions of glycol, foaming agent FA, catalyst, and the like thereinto, and may be suitable for use as the foamed thermal insulating material 150 because foaming thereof is evenly performed. When the foaming agent FA used in the present disclosure forms a urethane foam, composition and manufacturing method of the urethane foam are not limited to the above. In addition, the foamed thermal insulating material 150 provided in the cooling tank 100 of the present disclosure is not limited to urethane foam, and various types of known foaming agents FA may be used, when the tank body 110 is accommodated in the foaming case and foaming is effected between the foaming case and the external surface of the tank body 110.

The injection operation (S150) may be performed during a foaming agent (FA) input time period (e.g., a value selected from 1.3 to 1.7 seconds) preset in consideration of input speed and pressure of the foaming agent FA, such that a predetermined amount of the foaming agent FA in response to the foaming space S2 is injected into the foaming space S2. In this manner, the foaming agent FA may be injected according to a certain condition, such that the foamed thermal insulating material 150 has a certain quality (e.g., a constant density). In particular, when the density of the foamed thermal insulating material 150 is in a range of 0.065 to 0.085 g/cm$^3$ after curing is completed, a non-foamed region does not occur and thermal insulation performance and dew condensation performance may be sufficiently secured. Therefore, an injection amount of the foaming agent FA and injection time of the foaming agent FA corresponding thereto may be set such that the density becomes of 0.065 to 0.085 g/cm$^3$.

The injection operation (S150) may be performed using a urethane high-pressure foaming machine (not illustrated), and as an example of the foaming agent FA, a material mixed with BILLYOL (RF-334T) and ECO FOAM-A in a certain ratio (for example, 1:1.1 to 1.2) may be used.

When the injection of the foaming agent FA is completed, the injection port (136) closing operation (S160) of closing an injection port 136 may be additionally performed. When the injection of the foaming agent FA into the foaming space S2 starts, foaming of the foaming agent FA may be performed in the foaming space S2. To prevent the foaming agent FA from being exposed externally through the injection port 136, an operation of closing the injection port 136 may be performed. The injection port (136) closing operation (S160) may be performed by closing a portion of the injection port 136 of the foaming case 130 with a shielding film member (BM in FIG. 15), and a tape may be used as an example of the shielding film member BM, to easily perform an operation. The shielding film member BM is not limited thereto, and various materials and shapes may be changed, as long as the injection port 136 is easily closed. As illustrated in FIG. 10B, when a cutout 137, partially cut, is formed in the injection port 136, the cutout 137 may be folded in an injection direction when the foaming agent FA is injected, and may have a structure in which the cutout 137 moves in the opposite direction to close the injection port 136 during a foaming process of the foaming agent FA. In addition, as will be described later, after the injection of the foaming agent FA is completed, an upper surface of the foaming jig may be closed such that the injection port 136 is in a closed state by the foaming jig. Therefore, the injection port (136) closing operation (S160) may be selectively performed.

In this manner, after the injection operation (S150) is completed, or after the injection operation (S150) and the injection port (136) closing operation (S160) are completed, the upper surface closing operation (S170) of closing the upper surface of the foaming jig may be performed.

Moreover, after the upper surface closing operation (S170), the foaming-curing operation (S180) in which the foaming agent FA is foamed and cured may be performed.

When injection of the foaming agent FA into the foaming space S2 starts, foaming of the foaming agent FA may be performed in the foaming space S2. Therefore, as illustrated by the arrow in FIG. 15, air in the foaming space S2 may be discharged externally through the air outlet AE. In this case, a position of the air outlet AE may be set to prevent a non-foamed space from being formed by the foaming agent FA completely filling the foaming space S2 in the foaming-curing operation S180. In particular, since a corner outlet AE2 may be formed in a portion corresponding to a corner of the foaming case 130, complete foaming may be performed up to a corner portion of the foaming case 130. In this case, the corner outlet AE2 may have a diameter of about 1 mm, preferably 0.3 to 2.0 mm, more preferably 0.5 to 1.5 mm.

In addition, since the main outlet AE1 may be installed in a direction opposite to the injection port 136, to discharge a large amount of air through the main outlet AE1, foaming toward the main outlet AE1 may be smoothly performed.

This foaming-curing operation (S180) may be performed for a preset time period (e.g., 20 minutes±2 minutes) such that the foaming agent FA is completely foamed and the foamed foam is cured.

To ensure smooth foaming, the foaming jig may be maintained at a preset temperature (e.g., 40° C.±5° C.). To this end, the foaming jig may be configured to be maintained at the preset temperature from the opening operation (S120), until a subsequent process is performed.

Moreover, when the foaming-curing operation (S180) is completed, manufacturing of the cooling tank 100 may be completed, as illustrated in FIG. 16. Thereafter, a post-processing operation (S190) of post-processing and/or inspecting a cured cooling tank 100 may be performed. In the post-processing operation, the inspection operation of inspecting appearance of the cooling tank 100, an operation of removing burring that may partially occur during foaming, a grinding or deburring operation and an air cleaning operation, and a packaging operation, and the like may be performed.

Since the foaming case 130 includes the injection port 136 and the air outlet AE, a post-processing operation of sealing the injection port 136 and the air outlet AE through a filling material formed of a material such as silicone, hot melt, and the like, may be performed, to prevent the foamed thermal insulating material 150 from contacting external air through this space.

As described above, in a method for manufacturing a cooling tank 100 according to the present disclosure, quality problems of a foam powder flowing into a tank internal space may be minimized by inserting a foaming agent FA into a foaming space S2 formed between a foaming case 130 and a tank body 110 using the foaming case 130 to perform foaming, and maximally shielding leakage of a foaming liquid, and problems of mold or bacteria propagating in the foamed thermal insulating material 150 may be prevented by completely shielding a foamed thermal insulating material 150 from an external space through the foaming case 130. In addition, it is possible to sufficiently secure thermal insulation performance and anti-condensation performance through the foamed thermal insulating material 150.

[Water Purifier 300]

Figure 17:
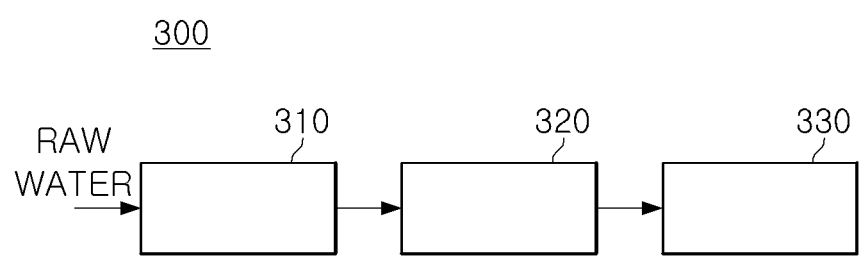
FIG. 17 is a view schematically illustrating a water purifier according to an embodiment of the present disclosure.

As illustrated in FIG. 17, a water purifier 300 may include a filter unit 310 filtering incoming raw water to generate purified water, a cold water generator 320 cooling the purified water filtered in the filter unit 310 to generate cold water, and an extracting unit 330 extracting the cold water cooled by the cold water generator 320.

The filter unit 310 may include a plurality of filters, as known to filter and purify raw water.

In addition, the cold water generator 320 may be configured to include a cooling tank assembly 200 having the cooling tank 100, mentioned above, and the tank cover 210, mentioned above. In addition, the cold water tank assembly 200 may be configured by a tank cooling method generating cold water with directly cooling water contained in a cold water tank by an evaporation tube (an evaporator) 230 as well as an ice-condensed cooling method illustrated in FIGS. 1 to 4.

Moreover, the extracting unit 330 may be configured to include a cock member or a faucet, to supply cold water to a user.

While example embodiments have been illustrated and described above, it will be apparent to those skilled in the art that modifications and variations could be made without departing from the scope of the present disclosure as defined by the appended claims.

DESCRIPTION OF REFERENCE CHARACTERS

100 . . . COOLING TANK, 101 . . . FOAM ASSEMBLY, 110 . . . TANK BODY,
111 . . . WATER FLOW PORT, 111A . . . FIRST STEPPED PORTION, 111B . . . SECOND STEPPED PORTION,
111C . . . END PORTION, 115 . . . BUMP, 115A . . . FIRST STEPPED PORTION,
115B . . . SECOND STEPPED PORTION, 115C . . . END PORTION, 118 . . . EVAPORATION TUBE SUPPORT GROOVE,
119 . . . COLD WATER PIPE SUPPORT, 120 . . . TANK RIM, 121 . . . PROTRUSION,
122 . . . RECESSED PORTION, 123 . . . STEPPED PORTION, 130 . . . FOAMING CASE,
131 . . . FIRST CASE, 132 . . . THROUGH-HOLE, 133 . . . SEATING BUMP, 134 . . . SEATING SURFACE,
135 . . . SECOND CASE, 136 . . . INJECTION PORT, 137 . . . CUTOUT, 138 . . . DIVISION PORTION,
140 . . . CASE EDGE PORTION, 141 . . . RECEIVING PORTION, 142 . . . PROTRUDING PORTION, 145 . . . LOWER SURFACE;
150 . . . FOAMED THERMAL INSULATING MATERIAL, 200 . . . COOLING TANK ASSEMBLY, 201 . . . COVER ASSEMBLY,
210 . . . TANK COVER, 211 . . . COVER BODY, 215 . . . OPENING, 220 . . . COLD WATER PIPE,
230 . . . EVAPORATION TUBE, 235 . . . CONNECTION MEMBER, 240 . . . STIRRING UNIT, 241 . . . MOTOR,
243 . . . STIRRING BLADE, 245 . . . CIRCULATION GUIDE MEMBER, 245A . . . SUPPORT GROOVE,
250 . . . COVER THERMAL INSULATING MATERIAL, 251 . . . OPENING, 300 . . . WATER PURIFIER, 310 . . . FILTER UNIT,
320 . . . COLD WATER GENERATOR, 330 . . . EXTRACTING UNIT, AE . . . AIR OUTLET,
AE1 . . . MAIN OUTLET, AE2 . . . CORNER OUTLET, BM . . . SHIELDING FILM MEMBER, FA . . . FOAMING AGENT,
FT . . . PIPE CONNECTION MEMBER, H1, H2 . . . FASTENING PORT, MB . . . SHIELDING FILM MEMBER,
OR . . . SEALING MEMBER, S1 . . . WATER ACCOMMODATION SPACE, S2 . . . FOAMING SPACE,
SL . . . WATER LEVEL SENSOR,
ST . . . TEMPERATURE SENSOR, T . . . BONDING MEMBER

The invention claimed is:

1. A cooling tank comprising:
   a tank body in which a water accommodation space is formed;
   a foaming case surrounding an external peripheral surface of the tank body; and
   a foamed thermal insulating material formed by a foaming process after a foaming agent is introduced into a foaming space between the external peripheral surface of the tank body and the foaming case,
   wherein the foamed thermal insulating material is integrated with the tank body and the foaming case by the foaming process, and
   an air outlet for discharging air from the foaming space during the foaming process is formed in the foaming case,
   wherein an injection port for injecting the foaming agent is formed in the foaming case;
   wherein the injection port is formed adjacent to one side of the foaming case, and the air outlet comprises a main outlet formed oppose the injection port and adjacent to an opposite side of the foaming case; and
   wherein the main outlet is provided for discharging air from the foaming case therethrough, and a shielding film member shielding for leakage of the foamed thermal insulating material is installed at the main outlet.

2. The cooling tank of claim 1, wherein the air outlet further comprises a corner outlet located at a corner of the foaming case.

3. The cooling tank of claim 1, wherein the foaming case has a divided structure.

4. The cooling tank of claim 1, wherein the foaming case has a downward inclination, inclined toward a center from an external side of a lower surface.

5. The cooling tank of claim 1, wherein the tank body has a tank edge portion corresponding to an open region, and
   the foaming case has a case edge portion corresponding to the tank edge portion,
   wherein the tank edge portion and the case edge portion are insertedly fastened to each other.

6. The cooling tank of claim 5, wherein the tank edge portion has protruding portions protruding toward the case edge portion, and
   the case edge portion has a receiving portion formed between protruding portions of the case edge portion to be insertedly fastened to the protruding portions of the tank edge portion.

7. The cooling tank of claim 1, wherein the tank body has a water flow port protruding toward the foaming case to enable flow of water accommodated in the water accommodation space, and
   a sealing member attached to the foaming case to seal the foaming space from an external space is installed on an external surface of the water flow port.

8. The cooling tank of claim 7, wherein the water flow port has a stepped structure in which a first stepped portion, a second stepped portion, and an end portion, having gradually smaller diameters in an external side direction of the tank body, are sequentially formed, and
   the foaming case has a through-hole through which an end portion of the water flow port is exposed externally, a seating surface formed around the through-hole and corresponding to the second stepped portion, and a seating bump protruding toward the tank body to correspond to the first stepped portion around the seating surface.

9. The cooling tank of claim 8, wherein the sealing member is provided between the first stepped portion and the seating bump.

10. The cooling tank of claim 1, wherein the tank body has a bump protruding from the tank body toward the foaming case, and
    a sealing member attached to the foaming case to seal the foaming space from an external space is installed on an external surface of the bump.

11. The cooling tank of claim 10, wherein the bump has a stepped structure in which a first stepped portion, a second stepped portion, and an end portion, having gradually smaller diameters in an external side direction of the tank body, are sequentially formed,
    the foaming case has a through-hole through which an end portion of the bump is exposed externally, a seating surface formed around the through-hole and corresponding to the second stepped portion, and a seating bump protruding toward the tank body to correspond to the first stepped portion around the seating surface, and
    the sealing member is provided between the first stepped portion and the seating bump.

12. A cooling tank assembly comprising:
    the cooling tank of claim 1; and
    a tank cover covering an open upper surface of the cooling tank,
    wherein at least a portion of a tube member and a sensor is coupled to the tank cover.

* * * * *